(12) United States Patent  
Anthony

(10) Patent No.: US 7,817,397 B2
(45) Date of Patent: *Oct. 19, 2010

(54) ENERGY CONDITIONER WITH TIED THROUGH ELECTRODES

(75) Inventor: William M. Anthony, Erie, PA (US)

(73) Assignee: X2Y Attenuators, LLC, Erie, PA (US)

( * ) Notice: Subject to any disclaimer, the term of this patent is extended or adjusted under 35 U.S.C. 154(b) by 429 days.

This patent is subject to a terminal disclaimer.

(21) Appl. No.: 11/817,618

(22) PCT Filed: Feb. 27, 2006

(86) PCT No.: PCT/US2006/006608

§ 371 (c)(1),
(2), (4) Date: Aug. 31, 2007

(87) PCT Pub. No.: WO2006/093831

PCT Pub. Date: Sep. 8, 2006

(65) Prior Publication Data

US 2008/0151459 A1 Jun. 26, 2008

Related U.S. Application Data

(60) Provisional application No. 60/661,002, filed on Mar. 14, 2005, provisional application No. 60/656,910, filed on Mar. 1, 2005, provisional application No. 60/671,107, filed on Apr. 14, 2005, provisional application No. 60/674,284, filed on Apr. 25, 2005.

(51) Int. Cl.
*H02H 9/00* (2006.01)

(52) U.S. Cl. .................................................... 361/118
(58) Field of Classification Search .................. 361/118
See application file for complete search history.

(56) References Cited

U.S. PATENT DOCUMENTS

| 3,240,621 A | 3/1966 | Flower, Jr. et al. |
| 3,343,034 A | 9/1967 | Ovshinsky |
| 3,379,943 A | 4/1968 | Breedlove |
| 3,573,677 A | 4/1971 | Detar |

(Continued)

FOREIGN PATENT DOCUMENTS

DE 197 28 692 A1 1/1999

(Continued)

OTHER PUBLICATIONS

Oct. 1, 2002, PCT International Search Report for PCT/US01/48861.

(Continued)

*Primary Examiner*—Stephen W Jackson
(74) *Attorney, Agent, or Firm*—Kenneth C. Spafford

(57) ABSTRACT

The application discloses energy conditioners that include A, B, and G master electrodes in which the A and B electrodes include main body electrodes with conductive paths that cross inside the energy conditioner and which has A and B tabs at one end of the main body electrodes conductively tied together and A and B tabs at another end of the main body electrodes conductively tied together, and the application also discloses novel assemblies of mounting, contacting, integrating those energy conditioners with conductive connection structures.

47 Claims, 11 Drawing Sheets

FIG. 6

U.S. PATENT DOCUMENTS

| | | |
|---|---|---|
| 3,736,471 A | 5/1973 | Donze et al. |
| 3,742,420 A | 6/1973 | Harnden, Jr. |
| 3,790,858 A | 2/1974 | Brancaleone et al. |
| 3,842,374 A | 10/1974 | Schlicke |
| 4,023,071 A | 5/1977 | Fussell |
| 4,119,084 A | 10/1978 | Eckels |
| 4,135,132 A | 1/1979 | Tafjord |
| 4,139,783 A | 2/1979 | Engeler |
| 4,191,986 A | 3/1980 | ta Huang et al. |
| 4,198,613 A | 4/1980 | Whitley |
| 4,259,604 A | 3/1981 | Aoki |
| 4,262,317 A | 4/1981 | Baumbach |
| 4,275,945 A | 6/1981 | Krantz et al. |
| 4,292,558 A | 9/1981 | Flick et al. |
| 4,308,509 A | 12/1981 | Tsuchiya et al. |
| 4,320,364 A | 3/1982 | Sakamoto et al. |
| 4,335,417 A | 6/1982 | Sakshaug et al. |
| 4,353,044 A | 10/1982 | Nossek |
| 4,366,456 A | 12/1982 | Ueno et al. |
| 4,384,263 A | 5/1983 | Neuman et al. |
| 4,394,639 A | 7/1983 | McGalliard |
| 4,412,146 A | 10/1983 | Futterer et al. |
| 4,494,092 A | 1/1985 | Griffin et al. |
| 4,533,931 A | 8/1985 | Mandai et al. |
| 4,553,114 A | 11/1985 | English et al. |
| 4,563,659 A | 1/1986 | Sakamoto |
| 4,586,104 A | 4/1986 | Standler |
| 4,587,589 A | 5/1986 | Marek |
| 4,590,537 A | 5/1986 | Sakamoto |
| 4,592,606 A | 6/1986 | Mudra |
| 4,612,140 A | 9/1986 | Mandai |
| 4,612,497 A | 9/1986 | Ulmer |
| 4,636,752 A | 1/1987 | Saito |
| 4,682,129 A | 7/1987 | Bakermans et al. |
| 4,685,025 A | 8/1987 | Carlomagno |
| 4,688,151 A | 8/1987 | Kraus et al. |
| 4,694,265 A | 9/1987 | Kupper |
| 4,698,721 A | 10/1987 | Warren |
| 4,703,386 A | 10/1987 | Speet et al. |
| 4,712,062 A | 12/1987 | Takamine |
| 4,712,450 A | 12/1987 | Takamine |
| 4,713,540 A | 12/1987 | Gilby et al. |
| 4,720,760 A | 1/1988 | Starr |
| 4,746,557 A | 5/1988 | Sakamoto et al. |
| 4,752,752 A | 6/1988 | Okubo |
| 4,760,485 A | 7/1988 | Ari et al. |
| 4,772,225 A | 9/1988 | Ulery |
| 4,777,460 A | 10/1988 | Okubo |
| 4,780,598 A | 10/1988 | Fahey et al. |
| 4,782,311 A | 11/1988 | Ookubo |
| 4,789,847 A | 12/1988 | Sakamoto et al. |
| 4,793,058 A | 12/1988 | Venaleck |
| 4,794,485 A | 12/1988 | Bennett |
| 4,794,499 A | 12/1988 | Ott |
| 4,795,658 A | 1/1989 | Kano et al. |
| 4,799,070 A | 1/1989 | Nishikawa |
| 4,801,904 A | 1/1989 | Sakamoto et al. |
| 4,814,295 A | 3/1989 | Mehta |
| 4,814,938 A | 3/1989 | Arakawa et al. |
| 4,814,941 A | 3/1989 | Speet et al. |
| 4,819,126 A | 4/1989 | Kornrumpf et al. |
| 4,845,606 A | 7/1989 | Herbert |
| 4,847,730 A | 7/1989 | Konno et al. |
| 4,904,967 A | 2/1990 | Morii et al. |
| 4,908,586 A | 3/1990 | Kling et al. |
| 4,908,590 A | 3/1990 | Sakamoto et al. |
| 4,924,340 A | 5/1990 | Sweet |
| 4,942,353 A | 7/1990 | Herbert et al. |
| 4,967,315 A | 10/1990 | Schelhorn |
| 4,978,906 A | 12/1990 | Herbert et al. |
| 4,990,202 A | 2/1991 | Murata et al. |
| 4,999,595 A | 3/1991 | Azumi et al. |
| 5,029,062 A | 7/1991 | Capel |
| 5,034,709 A | 7/1991 | Azumi et al. |
| 5,034,710 A | 7/1991 | Kawaguchi |
| 5,051,712 A | 9/1991 | Naito et al. |
| 5,059,140 A | 10/1991 | Philippson et al. |
| 5,065,284 A | 11/1991 | Hernandez |
| 5,073,523 A | 12/1991 | Yamada et al. |
| 5,079,069 A | 1/1992 | Howard et al. |
| 5,079,223 A | 1/1992 | Maroni |
| 5,079,669 A | 1/1992 | Williams |
| 5,089,688 A | 2/1992 | Fang et al. |
| 5,105,333 A | 4/1992 | Yamano et al. |
| 5,107,394 A | 4/1992 | Naito et al. |
| 5,109,206 A | 4/1992 | Carlile |
| 5,140,297 A | 8/1992 | Jacobs et al. |
| 5,140,497 A | 8/1992 | Kato et al. |
| 5,142,430 A | 8/1992 | Anthony |
| 5,148,005 A | 9/1992 | Fang et al. |
| 5,155,655 A | 10/1992 | Howard et al. |
| 5,161,086 A | 11/1992 | Howard et al. |
| 5,167,483 A | 12/1992 | Gardiner |
| 5,173,670 A | 12/1992 | Naito et al. |
| 5,179,362 A | 1/1993 | Okochi et al. |
| 5,181,859 A | 1/1993 | Foreman et al. |
| 5,186,647 A | 2/1993 | Denkmann et al. |
| 5,208,502 A | 5/1993 | Yamashita et al. |
| 5,219,812 A | 6/1993 | Doi et al. |
| 5,220,480 A | 6/1993 | Kershaw, Jr. et al. |
| 5,236,376 A | 8/1993 | Cohen |
| 5,243,308 A | 9/1993 | Shusterman et al. |
| 5,251,092 A | 10/1993 | Brady et al. |
| 5,257,950 A | 11/1993 | Lenker et al. |
| 5,261,153 A | 11/1993 | Lucas |
| 5,262,611 A | 11/1993 | Danysh et al. |
| 5,268,810 A | 12/1993 | DiMarco et al. |
| 5,290,191 A | 3/1994 | Foreman et al. |
| 5,299,956 A | 4/1994 | Brownell et al. |
| 5,300,760 A | 4/1994 | Batliwalla et al. |
| 5,310,363 A | 5/1994 | Brownell et al. |
| 5,311,408 A | 5/1994 | Ferchau et al. |
| 5,321,373 A | 6/1994 | Shusterman et al. |
| 5,321,573 A | 6/1994 | Person et al. |
| 5,326,284 A | 7/1994 | Bohbot et al. |
| 5,337,028 A | 8/1994 | White |
| 5,353,189 A | 10/1994 | Tomlinson |
| 5,353,202 A | 10/1994 | Ansell et al. |
| 5,357,568 A | 10/1994 | Pelegris |
| 5,362,249 A | 11/1994 | Carter |
| 5,362,254 A | 11/1994 | Siemon et al. |
| 5,378,407 A | 1/1995 | Chandler et al. |
| 5,382,928 A | 1/1995 | Davis et al. |
| 5,382,938 A | 1/1995 | Hansson et al. |
| 5,386,335 A | 1/1995 | Amano et al. |
| 5,396,201 A | 3/1995 | Ishizaki et al. |
| 5,401,952 A | 3/1995 | Sugawa |
| 5,405,466 A | 4/1995 | Naito et al. |
| 5,414,393 A | 5/1995 | Rose et al. |
| 5,414,587 A | 5/1995 | Kiser et al. |
| 5,420,553 A | 5/1995 | Sakamoto et al. |
| 5,432,484 A | 7/1995 | Klas et al. |
| 5,446,625 A | 8/1995 | Urbish et al. |
| 5,450,278 A | 9/1995 | Lee et al. |
| 5,451,919 A | 9/1995 | Chu et al. |
| RE35,064 E | 10/1995 | Hernandez |
| 5,455,734 A | 10/1995 | Foreman et al. |
| 5,461,351 A | 10/1995 | Shusterman |
| 5,463,232 A | 10/1995 | Yamashita et al. |
| 5,471,035 A | 11/1995 | Holmes |
| 5,477,933 A | 12/1995 | Nguyen |
| 5,481,238 A | 1/1996 | Carsten et al. |
| 5,483,407 A | 1/1996 | Anastasio et al. |
| 5,483,413 A | 1/1996 | Babb |

| | | | | | |
|---|---|---|---|---|---|
| 5,488,540 A | 1/1996 | Hatta | 5,959,846 A | 9/1999 | Noguchi et al. |
| 5,491,299 A | 2/1996 | Naylor et al. | 5,969,461 A | 10/1999 | Anderson et al. |
| 5,493,260 A | 2/1996 | Park | 5,977,845 A | 11/1999 | Kitahara |
| 5,495,180 A | 2/1996 | Huang et al. | 5,978,231 A | 11/1999 | Tohya et al. |
| 5,500,629 A | 3/1996 | Meyer | 5,980,718 A | 11/1999 | Van Konynenburg et al. |
| 5,500,785 A | 3/1996 | Funada | 5,995,352 A | 11/1999 | Gumley |
| 5,512,196 A | 4/1996 | Mantese et al. | 5,999,067 A | 12/1999 | D'Ostilio |
| 5,531,003 A | 7/1996 | Seifried et al. | 5,999,398 A | 12/1999 | Makl et al. |
| 5,534,837 A | 7/1996 | Brandt | 6,004,752 A | 12/1999 | Loewy et al. |
| 5,535,101 A | 7/1996 | Miles et al. | 6,013,957 A | 1/2000 | Puzo et al. |
| 5,536,978 A | 7/1996 | Cooper et al. | 6,016,095 A | 1/2000 | Herbert |
| 5,541,482 A | 7/1996 | Siao | 6,018,448 A | 1/2000 | Anthony |
| 5,544,002 A | 8/1996 | Iwaya et al. | 6,021,564 A | 2/2000 | Hanson |
| 5,546,058 A | 8/1996 | Azuma et al. | 6,023,406 A | 2/2000 | Kinoshita et al. |
| 5,548,255 A | 8/1996 | Spielman | 6,031,710 A | 2/2000 | Wolf et al. |
| 5,555,150 A | 9/1996 | Newman, Jr. | 6,034,576 A | 3/2000 | Kuth |
| 5,568,348 A | 10/1996 | Foreman et al. | 6,034,864 A | 3/2000 | Naito et al. |
| 5,570,278 A | 10/1996 | Cross | 6,037,846 A | 3/2000 | Oberhammer |
| 5,583,359 A | 12/1996 | Ng et al. | 6,038,121 A | 3/2000 | Naito et al. |
| 5,586,007 A | 12/1996 | Funada | 6,042,685 A | 3/2000 | Shinada et al. |
| 5,592,391 A | 1/1997 | Muyshondt et al. | 6,046,898 A | 4/2000 | Seymour et al. |
| 5,612,657 A | 3/1997 | Kledzik | 6,052,038 A | 4/2000 | Savicki |
| 5,614,881 A | 3/1997 | Duggal et al. | 6,061,227 A | 5/2000 | Nogi |
| 5,619,079 A | 4/1997 | Wiggins et al. | 6,064,286 A | 5/2000 | Ziegner et al. |
| 5,624,592 A | 4/1997 | Paustian | 6,072,687 A | 6/2000 | Naito et al. |
| 5,640,048 A | 6/1997 | Selna | 6,075,211 A | 6/2000 | Tohya et al. |
| 5,645,746 A | 7/1997 | Walsh | 6,078,117 A | 6/2000 | Perrin et al. |
| 5,647,766 A | 7/1997 | Nguyen | 6,078,229 A | 6/2000 | Funada et al. |
| 5,647,767 A | 7/1997 | Scheer et al. | 6,088,235 A | 7/2000 | Chiao et al. |
| 5,668,511 A | 9/1997 | Furutani et al. | 6,091,310 A | 7/2000 | Utsumi et al. |
| 5,682,303 A | 10/1997 | Goad | 6,092,269 A | 7/2000 | Yializis et al. |
| 5,692,298 A | 12/1997 | Goetz et al. | 6,094,112 A | 7/2000 | Goldberger et al. |
| 5,700,167 A | 12/1997 | Pharney et al. | 6,094,339 A | 7/2000 | Evans |
| 5,708,553 A | 1/1998 | Hung | 6,097,260 A | 8/2000 | Whybrew et al. |
| 5,719,450 A | 2/1998 | Vora | 6,097,581 A | 8/2000 | Anthony |
| 5,719,477 A | 2/1998 | Tomihari | 6,104,258 A | 8/2000 | Novak |
| 5,719,750 A | 2/1998 | Iwane | 6,104,599 A | 8/2000 | Ahiko et al. |
| 5,751,539 A | 5/1998 | Stevenson et al. | 6,108,448 A | 8/2000 | Song et al. |
| 5,767,446 A | 6/1998 | Ha et al. | 6,111,479 A | 8/2000 | Myohga et al. |
| 5,789,999 A | 8/1998 | Barnett et al. | 6,120,326 A | 9/2000 | Brooks |
| 5,790,368 A | 8/1998 | Naito et al. | 6,121,761 A | 9/2000 | Herbert |
| 5,796,568 A | 8/1998 | Baiatu | 6,125,044 A | 9/2000 | Cherniski et al. |
| 5,796,595 A | 8/1998 | Cross | 6,130,585 A | 10/2000 | Whybrew et al. |
| 5,797,770 A | 8/1998 | Davis et al. | 6,137,392 A | 10/2000 | Herbert |
| 5,808,873 A | 9/1998 | Celaya et al. | 6,142,831 A | 11/2000 | Ashman et al. |
| 5,825,084 A | 10/1998 | Lau et al. | 6,144,547 A | 11/2000 | Retseptor |
| 5,825,628 A | 10/1998 | Garbelli et al. | 6,147,587 A | 11/2000 | Hadano et al. |
| 5,828,093 A | 10/1998 | Naito et al. | 6,150,895 A | 11/2000 | Steigerwald et al. |
| 5,828,272 A | 10/1998 | Romerein et al. | 6,157,528 A | 12/2000 | Anthony |
| 5,828,555 A | 10/1998 | Itoh | 6,157,547 A | 12/2000 | Brown et al. |
| 5,831,489 A | 11/1998 | Wire | 6,160,705 A | 12/2000 | Stearns et al. |
| 5,834,992 A | 11/1998 | Kato et al. | 6,163,454 A | 12/2000 | Strickler |
| 5,838,216 A | 11/1998 | White et al. | 6,163,456 A | 12/2000 | Suzuki et al. |
| 5,867,361 A | 2/1999 | Wolf et al. | 6,165,814 A | 12/2000 | Wark et al. |
| 5,870,272 A | 2/1999 | Seifried et al. | 6,175,287 B1 | 1/2001 | Lampen et al. |
| 5,875,099 A | 2/1999 | Maesaka et al. | 6,180,588 B1 | 1/2001 | Walters |
| 5,880,925 A | 3/1999 | DuPre et al. | 6,181,231 B1 | 1/2001 | Bartilson |
| 5,889,445 A | 3/1999 | Ritter et al. | 6,183,685 B1 | 2/2001 | Cowman et al. |
| 5,895,990 A | 4/1999 | Lau | 6,185,091 B1 | 2/2001 | Tanahashi et al. |
| 5,898,403 A | 4/1999 | Saitoh et al. | 6,188,565 B1 | 2/2001 | Naito et al. |
| 5,898,562 A | 4/1999 | Cain et al. | 6,191,475 B1 | 2/2001 | Skinner et al. |
| 5,905,627 A | 5/1999 | Brendel et al. | 6,191,669 B1 | 2/2001 | Shigemura |
| 5,907,265 A | 5/1999 | Sakuragawa et al. | 6,191,932 B1 | 2/2001 | Kuroda et al. |
| 5,908,151 A | 6/1999 | Elias | 6,195,269 B1 | 2/2001 | Hino |
| 5,909,155 A | 6/1999 | Anderson et al. | 6,198,123 B1 | 3/2001 | Linder et al. |
| 5,909,350 A | 6/1999 | Anthony | 6,198,362 B1 | 3/2001 | Harada et al. |
| 5,910,755 A | 6/1999 | Mishiro et al. | 6,204,448 B1 | 3/2001 | Garland et al. |
| 5,912,809 A | 6/1999 | Steigerwald et al. | 6,205,014 B1 | 3/2001 | Inomata et al. |
| 5,917,388 A | 6/1999 | Tronche et al. | 6,207,081 B1 | 3/2001 | Sasaki et al. |
| 5,926,377 A | 7/1999 | Nakao et al. | 6,208,063 B1 | 3/2001 | Horikawa |
| 5,928,076 A | 7/1999 | Clements et al. | 6,208,225 B1 | 3/2001 | Miller |
| 5,955,930 A | 9/1999 | Anderson et al. | 6,208,226 B1 | 3/2001 | Chen et al. |
| 5,959,829 A | 9/1999 | Stevenson et al. | 6,208,494 B1 | 3/2001 | Nakura et al. |

| | | | | | | |
|---|---|---|---|---|---|---|
| 6,208,495 B1 | 3/2001 | Wieloch et al. | 6,738,249 B1 | 5/2004 | Anthony et al. | |
| 6,208,501 B1 | 3/2001 | Ingalls et al. | 6,806,806 B2 | 10/2004 | Anthony | |
| 6,208,502 B1 | 3/2001 | Hudis et al. | 6,873,513 B2 | 3/2005 | Anthony | |
| 6,208,503 B1 | 3/2001 | Shimada et al. | 6,894,884 B2 | 5/2005 | Anthony, Jr. et al. | |
| 6,208,521 B1 | 3/2001 | Nakatsuka | 6,950,293 B2 | 9/2005 | Anthony | |
| 6,208,525 B1 | 3/2001 | Imasu et al. | 6,954,346 B2 | 10/2005 | Anthony | |
| 6,211,754 B1 | 4/2001 | Nishida et al. | 6,995,983 B1 | 2/2006 | Anthony et al. | |
| 6,212,078 B1 | 4/2001 | Hunt et al. | 7,042,303 B2 | 5/2006 | Anthony et al. | |
| 6,215,647 B1 | 4/2001 | Naito et al. | 7,042,703 B2 | 5/2006 | Anthony et al. | |
| 6,215,649 B1 | 4/2001 | Appelt et al. | 7,050,284 B2 | 5/2006 | Anthony | |
| 6,218,631 B1 | 4/2001 | Hetzel et al. | 7,106,570 B2 | 9/2006 | Anthony, Jr. et al. | |
| 6,219,240 B1 | 4/2001 | Sasov | 7,110,227 B2 | 9/2006 | Anthony et al. | |
| 6,222,427 B1 | 4/2001 | Kato et al. | 7,110,235 B2 | 9/2006 | Anthony, Jr. et al. | |
| 6,222,431 B1 | 4/2001 | Ishizaki et al. | 7,113,383 B2 | 9/2006 | Anthony et al. | |
| 6,225,876 B1 | 5/2001 | Akino et al. | 7,141,899 B2 | 11/2006 | Anthony et al. | |
| 6,226,169 B1 | 5/2001 | Naito et al. | 7,180,718 B2 | 2/2007 | Anthony et al. | |
| 6,226,182 B1 | 5/2001 | Maehara | 7,193,831 B2 | 3/2007 | Anthony | |
| 6,229,226 B1 | 5/2001 | Kramer et al. | 7,224,564 B2 | 5/2007 | Anthony | |
| 6,236,572 B1 | 5/2001 | Teshome et al. | 7,262,949 B2 | 8/2007 | Anthony | |
| 6,240,621 B1 | 6/2001 | Nellissen et al. | 7,274,549 B2 | 9/2007 | Anthony | |
| 6,243,253 B1 | 6/2001 | DuPre et al. | 7,301,748 B2 | 11/2007 | Anthony et al. | |
| 6,249,047 B1 | 6/2001 | Corisis | 7,321,485 B2 | 1/2008 | Anthony et al. | |
| 6,249,439 B1 | 6/2001 | DeMore et al. | 7,336,467 B2 | 2/2008 | Anthony et al. | |
| 6,252,161 B1 | 6/2001 | Hailey et al. | 7,336,468 B2 | 2/2008 | Anthony et al. | |
| 6,262,895 B1 | 7/2001 | Forthun | 7,443,647 B2 * | 10/2008 | Anthony | 361/118 |
| 6,266,228 B1 | 7/2001 | Naito et al. | 2001/0001989 A1 | 5/2001 | Smith | |
| 6,266,229 B1 | 7/2001 | Naito et al. | 2001/0002105 A1 | 5/2001 | Brandelik et al. | |
| 6,272,003 B1 | 8/2001 | Schaper | 2001/0002624 A1 | 6/2001 | Khandros et al. | |
| 6,281,704 B2 | 8/2001 | Ngai et al. | 2001/0008288 A1 | 7/2001 | Kimura et al. | |
| 6,282,074 B1 | 8/2001 | Anthony | 2001/0008302 A1 | 7/2001 | Murakami et al. | |
| 6,282,079 B1 | 8/2001 | Nagakari et al. | 2001/0008478 A1 | 7/2001 | McIntosh et al. | |
| 6,285,109 B1 | 9/2001 | Katagiri et al. | 2001/0008509 A1 | 7/2001 | Watanabe | |
| 6,285,542 B1 | 9/2001 | Kennedy, III et al. | 2001/0009496 A1 | 7/2001 | Kappel et al. | |
| 6,292,350 B1 | 9/2001 | Naito et al. | 2001/0010444 A1 | 8/2001 | Pahl et al. | |
| 6,292,351 B1 | 9/2001 | Ahiko et al. | 2001/0011763 A1 | 8/2001 | Ushijima et al. | |
| 6,309,245 B1 | 10/2001 | Sweeney | 2001/0011934 A1 | 8/2001 | Yamamoto | |
| 6,310,286 B1 | 10/2001 | Troxel et al. | 2001/0011937 A1 | 8/2001 | Satoh et al. | |
| 6,313,584 B1 | 11/2001 | Johnson et al. | 2001/0013626 A1 | 8/2001 | Fujii | |
| 6,320,547 B1 | 11/2001 | Fathy et al. | 2001/0015643 A1 | 8/2001 | Goldfine et al. | |
| 6,324,047 B1 | 11/2001 | Hayworth | 2001/0015683 A1 | 8/2001 | Mikami et al. | |
| 6,324,048 B1 | 11/2001 | Liu | 2001/0017576 A1 | 8/2001 | Kondo et al. | |
| 6,325,672 B1 | 12/2001 | Belopolsky et al. | 2001/0017579 A1 | 8/2001 | Kurata | |
| 6,327,134 B1 | 12/2001 | Kuroda et al. | 2001/0019869 A1 | 9/2001 | Hsu | |
| 6,327,137 B1 | 12/2001 | Yamamoto et al. | 2001/0020879 A1 | 9/2001 | Takahashi et al. | |
| 6,331,926 B1 | 12/2001 | Anthony | 2001/0021097 A1 | 9/2001 | Ohya et al. | |
| 6,331,930 B1 | 12/2001 | Kuroda | 2001/0022547 A1 | 9/2001 | Murata et al. | |
| 6,342,681 B1 | 1/2002 | Goldberger et al. | 2001/0023983 A1 | 9/2001 | Kobayashi et al. | |
| 6,373,673 B1 | 4/2002 | Anthony | 2001/0024148 A1 | 9/2001 | Gerstenberg et al. | |
| 6,388,856 B1 | 5/2002 | Anthony | 2001/0028581 A1 | 10/2001 | Yanagisawa et al. | |
| 6,395,996 B1 | 5/2002 | Tsai et al. | 2001/0029648 A1 | 10/2001 | Ikada et al. | |
| 6,448,873 B1 | 9/2002 | Mostov | 2001/0031191 A1 | 10/2001 | Korenaga | |
| 6,456,481 B1 | 9/2002 | Stevenson | 2001/0033664 A1 | 10/2001 | Poux et al. | |
| 6,469,595 B2 | 10/2002 | Anthony et al. | 2001/0035801 A1 | 11/2001 | Gilbert | |
| 6,498,710 B1 | 12/2002 | Anthony | 2001/0035802 A1 | 11/2001 | Kadota | |
| 6,504,451 B1 | 1/2003 | Yamaguchi | 2001/0035805 A1 | 11/2001 | Suzuki et al. | |
| 6,509,807 B1 | 1/2003 | Anthony et al. | 2001/0037680 A1 | 11/2001 | Buck et al. | |
| 6,510,038 B1 | 1/2003 | Satou et al. | 2001/0039834 A1 | 11/2001 | Hsu | |
| 6,522,516 B2 | 2/2003 | Anthony | 2001/0040484 A1 | 11/2001 | Kim | |
| 6,549,389 B2 | 4/2003 | Anthony et al. | 2001/0040487 A1 | 11/2001 | Ikata et al. | |
| 6,563,688 B2 | 5/2003 | Anthony et al. | 2001/0040488 A1 | 11/2001 | Gould et al. | |
| 6,580,595 B2 | 6/2003 | Anthony et al. | 2001/0041305 A1 | 11/2001 | Sawada et al. | |
| 6,594,128 B2 | 7/2003 | Anthony | 2001/0043100 A1 | 11/2001 | Tomita et al. | |
| 6,603,372 B1 | 8/2003 | Ishizaki et al. | 2001/0043129 A1 | 11/2001 | Hidaka et al. | |
| 6,603,646 B2 | 8/2003 | Anthony et al. | 2001/0043450 A1 | 11/2001 | Seale et al. | |
| 6,606,011 B2 | 8/2003 | Anthony et al. | 2001/0043453 A1 | 11/2001 | Narwankar et al. | |
| 6,606,237 B1 | 8/2003 | Naito et al. | 2001/0045810 A1 | 11/2001 | Poon et al. | |
| 6,608,538 B2 | 8/2003 | Wang | 2001/0048581 A1 | 12/2001 | Anthony et al. | |
| 6,618,268 B2 | 9/2003 | Dibene, II et al. | 2001/0048593 A1 | 12/2001 | Yamauchi et al. | |
| 6,636,406 B1 | 10/2003 | Anthony | 2001/0048906 A1 | 12/2001 | Lau et al. | |
| 6,650,525 B2 | 11/2003 | Anthony | 2001/0050550 A1 | 12/2001 | Yoshida et al. | |
| 6,687,108 B1 | 2/2004 | Anthony et al. | 2001/0050600 A1 | 12/2001 | Anthony et al. | |
| 6,696,952 B2 | 2/2004 | Zirbes | 2001/0050837 A1 | 12/2001 | Stevenson et al. | |
| 6,717,301 B2 | 4/2004 | De Daran et al. | 2001/0052833 A1 | 12/2001 | Enokihara et al. | |

| Publication No. | Date | Name |
|---|---|---|
| 2001/0054512 A1 | 12/2001 | Belau et al. |
| 2001/0054734 A1 | 12/2001 | Koh et al. |
| 2001/0054756 A1 | 12/2001 | Horiuchi et al. |
| 2001/0054936 A1 | 12/2001 | Okada et al. |
| 2002/0000521 A1 | 1/2002 | Brown |
| 2002/0000583 A1 | 1/2002 | Kitsukawa et al. |
| 2002/0000821 A1 | 1/2002 | Haga et al. |
| 2002/0000893 A1 | 1/2002 | Hidaka et al. |
| 2002/0000895 A1 | 1/2002 | Takahashi et al. |
| 2002/0003454 A1 | 1/2002 | Sweeney et al. |
| 2002/0005880 A1 | 1/2002 | Ashe et al. |
| 2002/0024787 A1 | 2/2002 | Anthony |
| 2002/0027263 A1 | 3/2002 | Anthony et al. |
| 2002/0027760 A1 | 3/2002 | Anthony |
| 2002/0044401 A1 | 4/2002 | Anthony et al. |
| 2002/0075096 A1 | 6/2002 | Anthony |
| 2002/0079116 A1 | 6/2002 | Anthony |
| 2002/0089812 A1 | 7/2002 | Anthony et al. |
| 2002/0113663 A1 | 8/2002 | Anthony et al. |
| 2002/0122286 A1 | 9/2002 | Anthony |
| 2002/0131231 A1 | 9/2002 | Anthony |
| 2002/0149900 A1 | 10/2002 | Anthony |
| 2002/0158515 A1 | 10/2002 | Anthony, Jr. et al. |
| 2002/0186100 A1 | 12/2002 | Anthony et al. |
| 2003/0029632 A1 | 2/2003 | Anthony, Jr. et al. |
| 2003/0029635 A1 | 2/2003 | Anthony, Jr. et al. |
| 2003/0048029 A1 | 3/2003 | DeDaran et al. |
| 2003/0067730 A1 | 4/2003 | Anthony et al. |
| 2003/0161086 A1 | 8/2003 | Anthony |
| 2003/0202312 A1 | 10/2003 | Anthony et al. |
| 2003/0206388 A9 | 11/2003 | Anthony et al. |
| 2003/0210125 A1 | 11/2003 | Anthony |
| 2003/0231451 A1 | 12/2003 | Anthony |
| 2003/0231456 A1 | 12/2003 | Anthony et al. |
| 2004/0004802 A1 | 1/2004 | Anthony et al. |
| 2004/0008466 A1 | 1/2004 | Anthony et al. |
| 2004/0027771 A1 | 2/2004 | Anthony |
| 2004/0032304 A1 | 2/2004 | Anthony et al. |
| 2004/0054426 A1 | 3/2004 | Anthony |
| 2004/0085699 A1 | 5/2004 | Anthony |
| 2004/0105205 A1 | 6/2004 | Anthony et al. |
| 2004/0124949 A1 | 7/2004 | Anthony et al. |
| 2004/0130840 A1 | 7/2004 | Anthony |
| 2004/0218332 A1 | 11/2004 | Anthony et al. |
| 2004/0226733 A1 | 11/2004 | Anthony et al. |
| 2005/0016761 A9 | 1/2005 | Anthony, Jr. et al. |
| 2005/0018374 A1 | 1/2005 | Anthony |
| 2005/0063127 A1 | 3/2005 | Anthony |
| 2005/0248900 A1 | 11/2005 | Anthony |
| 2005/0286198 A1 | 12/2005 | Anthony et al. |
| 2006/0023385 A9 | 2/2006 | Anthony et al. |
| 2006/0139836 A1 | 6/2006 | Anthony |
| 2006/0139837 A1 | 6/2006 | Anthony et al. |
| 2006/0193051 A1 | 8/2006 | Anthony et al. |
| 2006/0203414 A1 | 9/2006 | Anthony |
| 2007/0019352 A1 | 1/2007 | Anthony |
| 2007/0047177 A1 | 3/2007 | Anthony |
| 2007/0057359 A1 | 3/2007 | Anthony et al. |
| 2007/0103839 A1 | 5/2007 | Anthony et al. |
| 2007/0109709 A1 | 5/2007 | Anthony et al. |

FOREIGN PATENT DOCUMENTS

| | | |
|---|---|---|
| DE | 198 57 043 C1 | 3/2000 |
| EP | 0623363 | 11/1994 |
| EP | 98915364 | 11/1994 |
| EP | 0776016 | 5/1997 |
| EP | 0933871 | 8/1999 |
| EP | 1022751 | 7/2000 |
| EP | 1024507 | 8/2000 |
| EP | 1061535 | 12/2000 |
| FR | 2765417 | 12/1998 |
| FR | 2808135 | 10/2001 |
| GB | 2217136 | 4/1988 |
| GB | 2341980 | 3/2000 |
| JP | 57-172130 | 10/1982 |
| JP | 63-269509 | 11/1988 |
| JP | 1-27251 | 1/1989 |
| JP | 02-267879 | 11/1990 |
| JP | 03-018112 | 1/1991 |
| JP | 5-283284 | 10/1993 |
| JP | 05-299292 | 11/1993 |
| JP | 06-053048 | 2/1994 |
| JP | 06-053049 | 2/1994 |
| JP | 06-053075 | 2/1994 |
| JP | 06-053077 | 2/1994 |
| JP | 06-053078 | 2/1994 |
| JP | 06-084695 | 3/1994 |
| JP | 06-151014 | 5/1994 |
| JP | 06-151244 | 5/1994 |
| JP | 06-151245 | 5/1994 |
| JP | 6-302471 | 10/1994 |
| JP | 06-325977 | 11/1994 |
| JP | 07-235406 | 9/1995 |
| JP | 07-235852 | 9/1995 |
| JP | 07-240651 | 9/1995 |
| JP | 08-124795 | 5/1996 |
| JP | 08-163122 | 6/1996 |
| JP | 08-172025 | 7/1996 |
| JP | 8172025 | 7/1996 |
| JP | 9-266130 | 10/1997 |
| JP | 09-284077 | 10/1997 |
| JP | 09-284078 | 10/1997 |
| JP | 9-294041 | 11/1997 |
| JP | 11-21456 | 8/1999 |
| JP | 11-214256 | 8/1999 |
| JP | 11-223396 | 8/1999 |
| JP | 11-294908 | 10/1999 |
| JP | 11-305302 | 11/1999 |
| JP | 11-319222 | 11/1999 |
| JP | 11-345273 | 12/1999 |
| WO | WO 91/15046 | 10/1991 |
| WO | WO 97/20332 | 6/1997 |
| WO | WO 97/43786 | 11/1997 |
| WO | WO 98/45921 | 10/1998 |
| WO | WO 99/04457 | 1/1999 |
| WO | WO 99/19982 | 4/1999 |
| WO | WO 99/37008 | 7/1999 |
| WO | WO 99/52210 | 10/1999 |
| WO | WO 00/16446 | 3/2000 |
| WO | WO 00/65740 | 11/2000 |
| WO | WO 00/74197 | 12/2000 |
| WO | WO 00/77907 | 12/2000 |
| WO | 01/06631 | 1/2001 |
| WO | WO 01/10000 | 2/2001 |
| WO | WO 01/41232 | 6/2001 |
| WO | WO 01/41233 | 6/2001 |
| WO | WO 01/45119 | 6/2001 |
| WO | WO 01/71908 | 9/2001 |
| WO | WO 01/75916 | 10/2001 |
| WO | WO 01/84581 | 11/2001 |
| WO | WO 01/86774 | 11/2001 |
| WO | WO 02/59401 | 1/2002 |
| WO | WO 02/11160 | 2/2002 |
| WO | WO 02/15360 | 2/2002 |
| WO | WO 02/27794 | 4/2002 |
| WO | WO 02/33798 | 4/2002 |
| WO | WO 02/45233 | 6/2002 |
| WO | WO 02/065606 | 8/2002 |
| WO | WO 02/080330 | 10/2002 |
| WO | WO 03/005541 | 1/2003 |
| WO | WO 2004/070905 | 8/2004 |
| WO | WO 2005/002018 | 1/2005 |
| WO | WO 2005/015719 | 2/2005 |
| WO | WO 2005/065097 | 7/2005 |
| WO | WO 2006/093830 | 9/2006 |

| WO | WO 2006/093831 | 9/2006 |
| WO | WO 2006/099297 | 9/2006 |
| WO | WO 2006/104613 | 10/2006 |
| WO | WO 2007/103965 | 9/2007 |

OTHER PUBLICATIONS

Jan. 2, 2003, PCT International Search Report for PCT/US01/44681.
Jan. 1, 1994, Greb, "An Intuitive Approach to EM Fields," EMC Test & Design, pp. 30-33.
Dec. 1, 1993, Greb, "An Intuitive Approach to EM Coupling," EMC Test & Design, pp. 20-25.
Jun. 1, 1986, Sakamoto, "Noiseproof Power Supplies: What's Important in EMI Removal Filters?" JEE, pp. 80-85.
Jan. 1, 1999, Montrose, "Analysis on Loop Area Trace Radiated Emissions from Decoupling Capacitor Placement on Printed Circuit Boards," IEEE, pp. 423-428.
Jan. 1, 1999, Miyoshi, "Surface Mounted Distributed Constant Type Noise Filter," IEEE, pp. 157-160.
Jan. 1, 1999, Shigeta et al., "Improved EMI Performance by Use of a Three-Terminal-Capacitor Applied to an IC Power Line," IEEE, pp. 161-164.
Jul. 19, 1999, PCT International Search Report for PCT/US99/07653.
Oct. 13, 1999, IPER for PCT/US99/07653.
U.S. Appl. No. 10/479,506, Claims 1-46 from Preliminary Amendment filed Dec. 10, 2003.
U.S. Appl. No. 10/189,339, Claims 1-41 from Preliminary Amendment filed Oct. 28, 2003.
U.S. Appl. No. 10/443,792, Claims 1-41 from Preliminary Amendment filed Oct. 28, 2003.
Aug. 19, 1998, PCT International Search Report for PCT/US98/06962.
Apr. 19, 1999, PCT International Search Report for PCT/US99/01040.
Sep. 18, 2000, PCT International Search Report for PCT/US00/11409.
Sep. 13, 2000, PCT International Search Report for PCT/US00/14626.
Nov. 8, 2000, PCT International Search Report for PCT/US00/16518.
Dec. 28, 2000, PCT International Search Report for PCT/US00/21178.
Jan. 1, 1992, Fang et al., "Conductive Polymers Prolong Circuit Life," Design News, pp. 99, 100,and 102.
Sep. 1, 1996, Carpenter, Jr. et al., "A New Approach to TVSS Design," Power Quality Assurance, Sep./Oct. 1996 p. 60-63.
Jan. 1, 1996, Raychem, "Polyswitch Resettable Fuses," Circuit Protection Databook, pp. 11-18.
Dec. 28, 2001, PCT International Search Report for PCT/US01/41720.
Jun. 13, 2001, PCT International Search Report for PCT/US01/09185.
Jul. 1, 2000, Polka et al., "Package-Level Interconnect Design for Optimum Electrical Performance," Intel Technology Journal Q3, pp. 1-17.
May 10, 2002, PCT International Search Report for PCT/US01/43418.
Mar. 13, 2002, PCT International Search Report for PCT/US01/32480.
Aug. 19, 2002, PCT International Search Report for PCT/US02/10302.
Feb. 28, 2003, PCT International Search Report for PCT/US02/21238.
Mar. 18, 2002, PCT International Search Report for PCT/US01/13911.
Jul. 16, 1991, PCT International Search Report for PCT/US91/02150.
Jun. 28, 2001, PCT International Search Report for PCT/US01/03792.
"Johanson Dielectrics, Inc. Licenses X2Y Circuit Conditioning Technology," Press Release, Dec. 16, 1998, 1 page.
Mar. 1, 1997, Beyne et al. "PSGA—an innovative IC package for single and multichip designs," Components, pp. 6-9.
"EMC Design for Brush Commutated DC Electric Motors," Sep. 15, 1997, pp. 1-2.
Apr. 1, 1996, "Tomorrow's Capacitors," Components, No. 4, p. 3.
Mason, "Valor—Understanding Common Mode Noise," Mar. 30, 1998, pp. 1-7.
Anthony Anthony et al., Pending specification, claims, figures for U.S. Appl. No. 10/237,079, Claims 21-81; filed Sep. 9, 2002.
David Anthony et al., Pending specification, claims, figures for U.S. Appl. No. 10/766,000, Claims 1-63; filed Jan. 29, 2004.
William Anthony, Pending specification, claims, figures for U.S. Appl. No. 10/399,630, Claims 1-35; filed Aug. 27, 2003.
Anthony Anthony et al., Pending specification, claims, figures for U.S. Appl. No. 10/432,840, Claims 1-39; filed May 28, 2003.
William Anthony, Pending specification, claims, figures for U.S. Appl. No. 10/443,482, Claims 1-25; filed Jun. 12, 2003.
Anthony Anthony et al., Pending specification, claims, figures for U.S. Appl. No. 10/435,199, Claims 1-32; filed May 12, 2003.
Anthony Anthony et al., Pending specification, claims, figures for U.S. Appl. No. 10/115,159, Claims 1-31; filed Apr. 2, 2002.
Anthony Anthony et al., Pending specification, claims, figures for U.S. Appl. No. 10/189,338, Claims 1-69; filed Jul. 2, 2002.
Anthony Anthony et al., Pending specification, claims, figures for U.S. Appl. No. 10/189,339, Claims 1-41; filed Jul. 2, 2002.
Anthony Anthony et al., Pending specification, claims, figures for U.S. Appl. No. 10/479,506, Claims 1-46; filed Dec. 10, 2003.
Anthony Anthony, Pending specification, claims, figures for U.S. Appl. No. 10/443,764, Claims 26-40; filed Sep. 16, 2003.
Anthony Anthony, Pending specification, claims, figures for U.S. Appl. No. 10/443,792, Claims 1-41; May 23, 2003.
Anthony Anthony, Pending specification, claims, figures for U.S. Appl. No. 10/443,788, Claims 1; 21-45; filed May 23, 2003.
Anthony Anthony et al., Pending specification, claims, figures for U.S. Appl. No. 10/443,778, Claims 1; 21-59; filed May 23, 2003.
Anthony Anthony et al., Pending specification, claims, figures for U.S. Appl. No. 10/460,361, Claims 1-16; filed Jun. 13, 2003.
Anthony Anthony et al., Pending specification, claims, figures for U.S. Appl. No. 10/705,962, Claims 19-33; filed May 25, 2005.
Anthony Anthony, Pending specification, claims, figures for U.S. Appl. No. 10/369,335, Claims 1-20; Feb. 18, 2003.
Anthony Anthony et al., Pending specification, claims, figures for U.S. Appl. No. 09/647,648, Claims 1-48; filed Nov. 17, 2000.
Anthony Anthony, Pending specification, claims, figures for U.S. Appl. No. 10/328,942, Claims 1-20; filed Dec. 23, 2002.
Anthony Anthony et al., Pending specification, claims, figures for U.S. Appl. No. 09/632,048, Claims 1-20; filed Aug. 3, 2000.
Anthony Anthony et al., Pending specification, claims, figures for U.S. Appl. No. 09/996,355, Claims 1-73; filed Nov. 29, 2001.
William Anthony, Pending specification, claims, figures for U.S. Appl. No. 10/023,467, Claims 1-20; filed Dec. 17, 2001.
Jan. 1, 2005, Weir, et al., "DesignCon 2005, High Performance FPGA Bypass Networks".
Apr. 25, 2002, Pending claims 1-40 and figures (3 pages) for U.S. Appl. No. 10/399,590; the specification is contained in WO 02/33798, filed Oct. 17, 2001, which is the published version of PCT/US01/32480, which is Neifeld Reference: X2Y A0015UPCT-US, which is reference F-063 in the Information Disclosure Statement filed Apr. 23, 2004.
Feb. 11, 2005, PCT International Search Report for PCT/US04/00218.
Feb. 18, 2005, PCT International Search Report for PCT/US04/14539.
Mar. 24, 2005, Australian Patent Office Examination Report for SG 200303041-8; Neifeld Ref: X2YA0025UPCT-SG.
Apr. 11, 2005, PCT International Search Report for PCT/US04/18938.
Nov. 2000, Muccioli, "EMC Society Seattle and Oregon Chapters—New X2Y Filter Technology Emerges as Singles Component Solution for Noise Suppression".
Sep. 27, 2005, PCT Corrected IPER for PCT/US04/00218.
Nov. 8, 2005, Supplementary Partial European Search Report EP 99916477.

Oct. 27, 2005, Supplementary European Search Report EP 98915364.
Dec. 9, 2005, PCT ISR for PCT/US04/39777.
May 8, 2006, EP Examination Report for 99916477.5-2215.
Jul. 24, 2007, PCT Written Opinion of the International Search Authority, PCT/US2007/063463.
Jul. 24, 2007, PCT International Search Report, PCT/US2007/063463.
Oct. 31, 2007, PCT International Search Report PCT/US06/06609.
Oct. 31, 2007, PCT Written Opinion of the International Search Authority PCT/US06/06609.
Jun. 12, 2008, PCT International Search Report PCT/US06/06608.
Jun. 12, 2008, PCT Written Opinion of the International Search Authority PCT/US06/06608.
Jun. 12, 2008, PCT International Search Report PCT/US06/06607.
Jun. 12, 2008, PCT Written Opinion of the International Search Authority PCT/US06/06607.
Jun. 17, 2008, PCT International Search Report PCT/US06/08901.
Jun. 17, 2008, PCT Written Opinion of the International Search Authority PCT/US06/08901.
Jun. 6, 2008, European Search Report EP 07 01 9451.

* cited by examiner

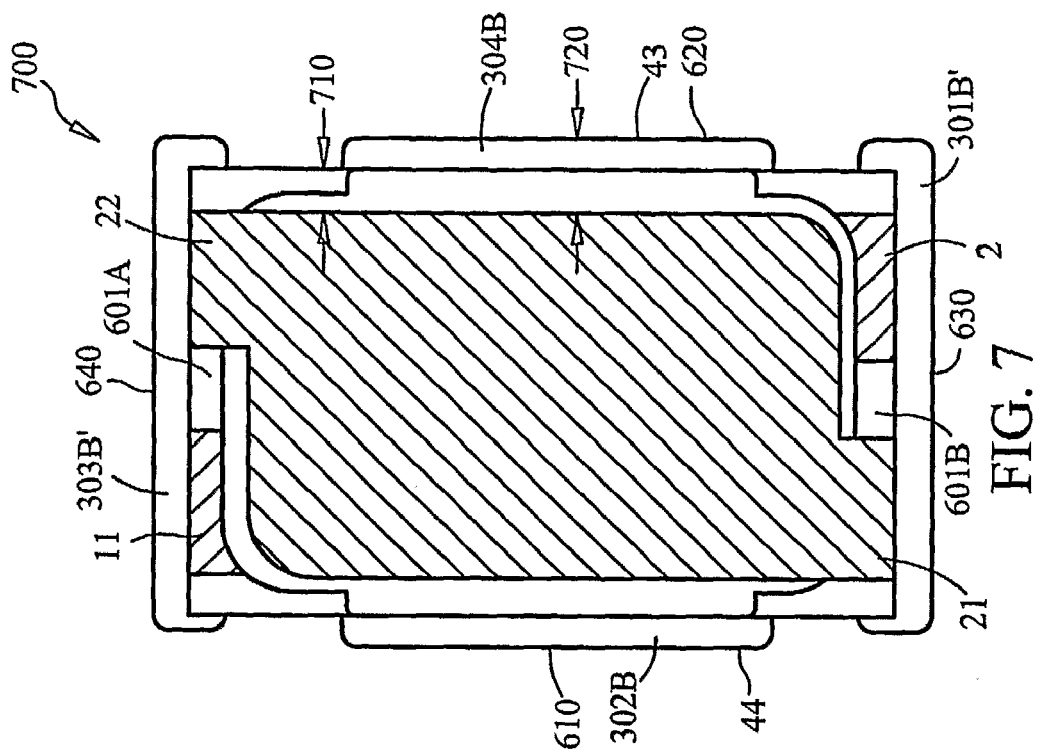
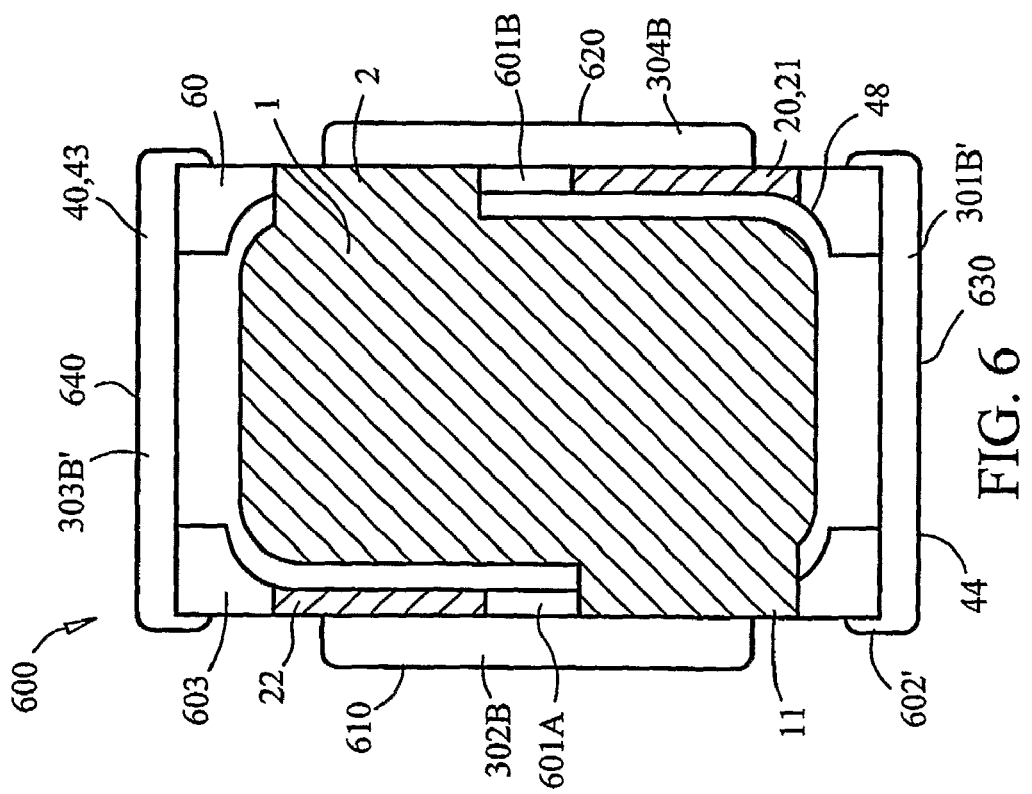

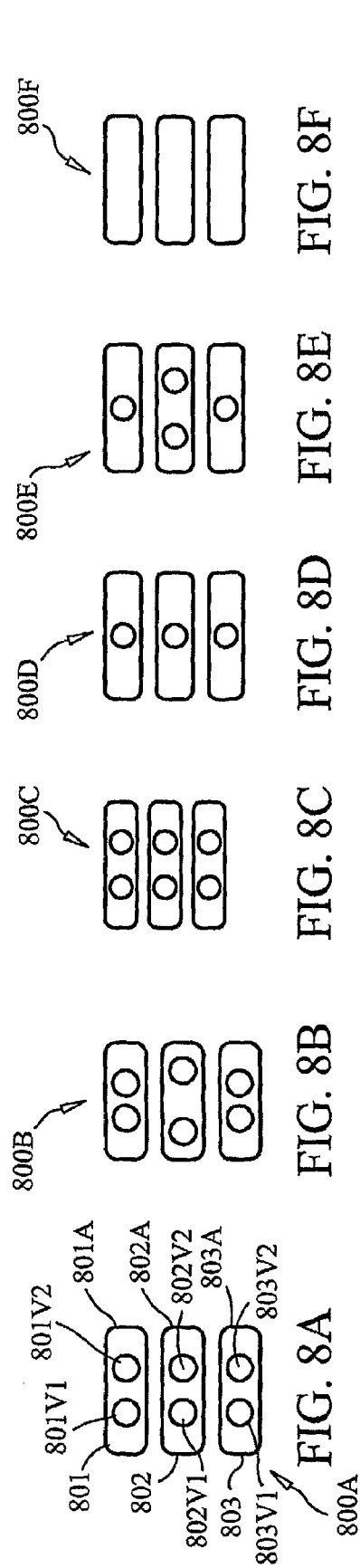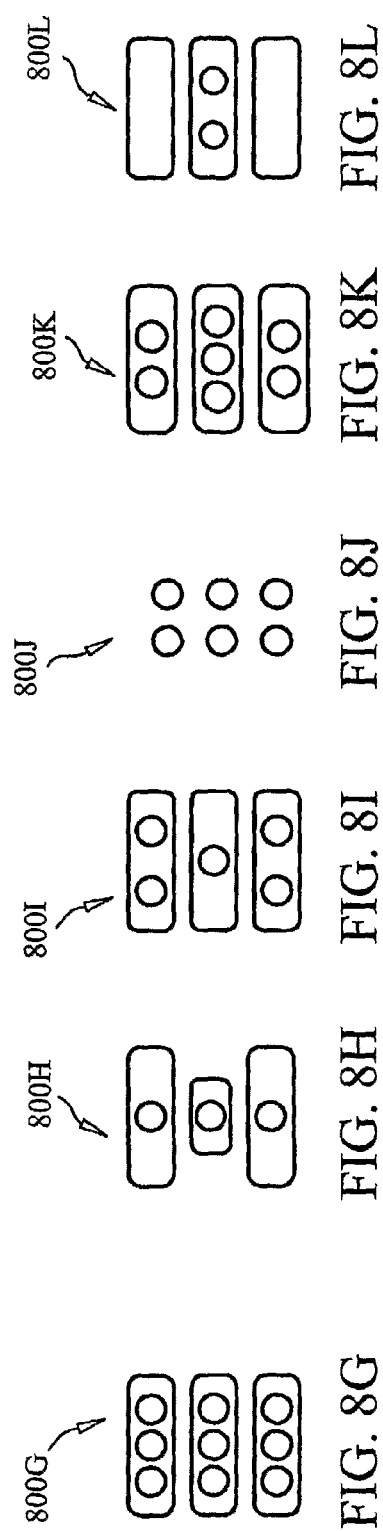

ENERGY CONDITIONER WITH TIED THROUGH ELECTRODES

CROSS REFERENCE TO RELATED APPLICATIONS

This application is a U.S. national stage entry of international application PCT/US06/06608 filed Feb. 27, 2006, which claims priority to U.S. provisional application No. 60/661,002, filed Mar. 14, 2005, and claims priority to U.S. provisional application No. 60/656,910, filed Mar. 1, 2005, and claims priority to U.S. provisional application No. 60/671,107, filed Apr. 14, 2005, and claims priority to U.S. provisional application No. 60/674,284, filed Apr. 25, 2005.

The disclosures of the foregoing applications are incorporated herein by reference.

FIELD OF USE

This disclosure relates to energy conditioner structures.

BACKGROUND

There is a need for effective noise filtering in electronic devices. There is also a need for electronic components that reduce the number of total components and connections to perform electronic device functions, to reduce cost and improve reliability.

SUMMARY

This disclosure addresses the foregoing needs by providing novel structures including novel conductive layer structures and arrangements, novel conductive layering sequences, novel energy conditioners and decoupling capacitors, novel energy conditioner packaging, novel conductive pad, via, and pad and via combination configurations, and novel arrangements of decoupling capacitor or energy conditioner bands with configurations of conductive pad, via, and pad and via combinations.

The novel structures of a new embodiment are effective as decoupling capacitors for power distribution systems (PDS) as well as effective as energy conditioners for suppressing noise. Certain embodiments of the novel decoupling capacitors and energy conditioner structures are discrete components designed for connection to mounting structure(s) on boards, such as PC boards, to first level interconnects, and to semiconductor chips, such as integrated circuits. Other embodiments are designed as integrated parts of a PC board, first level interconnects, or semiconductor chips, such as an integrated circuit.

The term energy conditioner is used herein below to refer to structures having both decoupling and noise suppression functions.

A, B, and G Master Electrodes:

The novel energy conditioners all include at least three internal master electrodes, A, B, and G master electrodes, each of which includes electrically conductive material. As described in more detail below, the novel energy conditioners are designed to provide split and separated routes that facilitate a cross-over of paths for portions of energy flowing through main body electrodes of at least two of the three master electrodes. Preferably cross-over pathways are created by positioning of at least two sets of complementary tab portions at edges of main body electrodes. The first set of complementary tab portions are part of main body electrodes of the A master electrode. The second set of complementary tab portions are part of main body electrodes of the B master electrode. A and B tab portions along a first edge of the structure are conductively tied together. A and B tab portions along a second edge of the structure are conductively tied together. Between the two edges, conductive paths in the A master electrode cross conductive pathways in the B master electrode.

The conductive ties may be effected by a conductive band formed onto the side of the energy conditioner, or by conductive connection of bands each of which is connected to only one of the A or B electrodes via external solder, conductive paste, or by conductive connection of bands each of which is connected to only one of the A or B electrodes via conductive connection of multiple such bands to the same conductive mounting pad.

In most embodiments, a majority of the area of the G master electrode shields a majority of the area of the A master electrode path from a majority of the area of a B master electrode path.

Certain embodiments also provide a combination of energy conditioners and connections to mounting structures of first level interconnects, such as a PC board, substrates, IC packages, IC chips, etc., providing at least on the energy conditioner at least three points of conductive connection to the conductive elements of a mounting structure, and in which the energy conditioner has at least three internal master electrodes, A, B, and G.

An important aspect of certain embodiment is the combination of energy conditioner external conductive bands, particularly for (1) energy conditioners having more than three conductive bands and (2) a mounting structure having no more than four surface mounting structure conductive elements (conductive pads, conductive lined via(s) or conductively-filled vias, or the like) to which said energy conditioner structure mounts, such that two or more of the conductive bands of the energy conditioner both contact the same conductive surface mounting structure. This allows the conductive connection of the bands to the energy conditioner to conductively tie tabs of the A master electrode to tabs of the B master electrode. It should be noted that the surface mounting structure may include additional conductive elements located remote from where one energy conditioner is mounted in order to mount additional circuit elements, such as additional energy conditioners, thereto.

Inside each energy conditioner, the A, B and G master electrodes are conductively isolated from one another. Tabs of the A and B master electrodes may be conductively tied together by manufacturing processes that adds conductive termination structure located and attached to the outer surface of an energy conditioner. This will create a configuration wherein the G master electrode is conductively isolated from both the A master electrode and the B master electrode, and the A master electrode and the B master electrode are conductively connected at the conductive termination structure.

A-G and B-G Overlap Regions

Preferably, the A, B, and G master electrodes each include at least one main body electrode. Each main body electrode has major surfaces, and the major surfaces of all of the main body electrodes are substantially parallel with one another. Moreover, substantial portions of the A main body electrodes and G main body electrodes overlap one another. Moreover, substantial portions of the B main body electrodes and G main body electrodes overlap one another.

Preferably, each main body electrode of anyone master electrode has the shape of a layer.

Each main body electrode of the A, B, and G master electrodes has an area for each of its major surfaces. Preferably, the area of the major surfaces of the main body electrodes of the A and B master electrodes is less than or equal to the area of the major surfaces of the main bodies of the G master electrodes.

Preferably, each main body electrode has the shape of a layer. Although the main body electrodes need not be layers, the description below refers to the A, B and G main body electrodes as the preferred structure of layers, A, B, and G layers, for convenience. However, the inventors contemplate that the more general main body concept may be substituted wherever reference appears to layers of any one of the A, B, and G master electrodes.

A, B Layer Tab Portions

The A master electrode layers, also called A layers, are defined as layers with generally the same shape as one another.

The B master electrode layers, also called B layers, are defined as layers with generally the same shape as one another.

A layers each have at least two tab portions and a main body portion. Preferably the tab portions of the A layers are relatively small compared to the non-tab main body portion of the A layers. The tab portions of the A layers are those portions of the A layers that extend beyond perimeter portion(s) of G main-body layers.

B layers each have at least two tab portions and a main body portion. Preferably the tab portions of the B layers are relatively small compared to the non-tab main body portions. The tab portions of the B layers are those portions of the B layers that extend beyond perimeter portion(s) of G main-body layers. Preferably, the tab portions extend in the plane of the layer.

Preferably, the tab portions of the A layers do not overlap the tab portions of the B layers in the dimensions of the plane in which the layers extend. Preferably, in the direction of the planes of the major surfaces of the A and B layers, there is a non-zero distance separating tab portions of A layers adjacent tab portions of B layers.

Preferably, tab portions of the A layers that are adjacent tab portions of the B layers, are separated there from by a non-zero distance.

The G master electrode has at least one G many body electrode. Preferably, the G main body electrodes are in the form of G main body layers.

Preferably, one or more G main body layers extends in the plane defined by a major surface beyond the perimeter of the main-body portions of A and B layers (and any other layers). Alternatively, the main bodies of the G layers may be co-extensive with the main bodies of the A and B layers.

The G layer also has at least first and second tab portions. Preferably, the first and second tabs of the G layer are relatively small compared to the area in which the G layer overlaps either the A layer or the B layer.

Preferably, the tab portions of the A and B layers (and tabs of any other layers) extend beyond the perimeter of the main bodies of the G layers.

There is a setback relationship between the extension of the G layers and the separation of the layers defined by setback=VD/D (vertical distance divided by horizontal distance). HD is a distance in the plane of the major surfaces between a point on the perimeter of the main body of any one G main-body electrode and the closes point on the perimeter of the main body of any one A or B main-body electrode.

VD is the shortest distance separating a G main body layer from an A or B main body layer.

Preferably, the setback ratio, VD/HD may be as low as zero or as high as 200. Setback may attain any real, fractional, or integer value there between, such as 0.5, 1, 1.233, 2, 3, 3.5, etc.

Main-Body Overlap Regions

Preferably, in the region of main body overlap with the G layers, the layers of the A, B, and G master electrodes do not directly contact one another (A main bodies do not contact each other or main bodies of B and G), and there is no conductive path in the overlapped region connecting any structure of the A, B, and G master electrodes to one another. Alternatively, A main bodies may be interconnected to one another in the overlap region, and/or B main bodies may be interconnected to one another in the overlap region, and/or G main bodies may be interconnected to one another in the overlap region.

Tying of A and B Master Electrodes

The energy conditioner is designed so that (1) a first tab of a layer of the A master electrode (A layer) and a first tab of a layer of the B master electrode (B layer) can be electrically connected by a portion of a conductive path at a location outside the overlapped regions of the main bodies and (2) a second tab of the same A layer and a second tab of the same B layer can be electrically connected to one another at a location outside the overlapped regions of the main bodies. An outer electrode terminal is one such example of a connection that is outside the overlapped region.

The conductively connecting of various tabs of different conductive layers which provides a conductive path between tabs which does not pass through the overlapped regions is referred to herein as tying. For example, conductive connection of the first tab of the A layer and the first tab of the B layer, as just describe, are tied together.

An A conductive path in the A layer extends from the first tab of the A layer through the region in which the A layer overlaps with the G master electrode to the second tab of the A layer. These tabs are in a position offset, relative to one another. The off set position of a tab pair allows energy to transverse the electrode layer in a non-direct manner. For example in FIG. 1A tab 2 is located on the opposite side and offset tab 11. For energy entering from tab 2 of electrode layer 1 of FIG. 1A, it must angles across to egress tab 11.

Also, a B conductive path in the B layer extends from the first tab of the B layer through the region in which the B layer overlaps with the G master electrode to the second tab of the B layer. Like FIG. 1A above, these tabs 21 and 22 of FIG. 1B are in a position offset, relative to one another. The off set position of a tab pair allows energy to transverse the electrode layer in a non-direct manner. For example in FIG. 1B tab 21 is located on the opposite side and offset tab 22. For energy entering from tab 21 of electrode layer of FIG. 1b, it must angles across to egress tab 22.

In almost all embodiments, the complementary positioning of A and B electrode layers and their tabs allows for an A conductive path that overlaps with a B conductive path, such that the A and B conductive paths inside the energy conditioner cross over one another. Preferably, all A conductive paths in the A layer overlap any B conductive path in the B layer, such that all A and B conductive paths inside the energy conditioner cross over one another.

As a result of the conductive tying of the adjacent first tabs of the A and B layer to one another, and the cross over of A and B paths, energy passing through the A layer inside the conditioner must cross over the B layer, and vice versa. By conductive tying of the adjacent second tabs of the A and B layer, the configuration creates a balanced, tied structure. In addition, the tying results in uniform distribution of energy flow between the A layer and the B layer.

Preferably in many instances, the contacting elements from the main bodies of the A, B, and G master electrodes to the circuit board, first level interconnect, or semiconductor conductive pathways are as wide as can be designed without shorting or arcing to one another, to provide relatively low impedance, particularly a relatively low ESR and ESL.

Moreover, ESR can be affected, as needed, based upon size and shape of certain elements. Wider tabs at the points of coupling to outer bands will decrease component ESR to provide relatively low impedance for an energized circuit, particularly a relatively low contribution to the overall circuit ESL.

For example, for FIG. 4H, the wider outer band terminals generally provide lower internal resistance than narrower outer band terminals. For another example, compare FIG. 4A to FIG. 4L, in which the relatively wider cap shaped bands in FIG. 4L, corresponding in shape to cap shaped bands 401A, 402B in FIG. 4A; provide relatively lower resistance, assuming the same band thickness and band material resistivity. Thus, novel energy conditioners can be designed with tradeoffs between relative ESR and ESL of pathways with circuit design specifications of system impedance in mind.

Embodiments may have multiple A master electrode layers and multiple B master electrode layers. In embodiments having multiple A and B layers, preferably all first tabs are designed to be tied to one another and all second tabs are designed to be tied to one another. However, each A or B layer may have additional tabs, such as third tabs and fourth tabs (or more tabs) and in these embodiments, all third tabs are designed to be tied to one another and all fourth tabs are designed to be tied to one another. In the more than two tabs per layer embodiments, each set of at least two tabs tied together are designed to provide cross over in the manner defined above.

In embodiments having more than type A and B layers, such as A, B, C, and D layers, pairs of type of layers, such as the A, B pair and the C, D pair, are designed to provide crossover and tying.

The first tabs of layers of each G master electrode are conductively connected to one another, either by a conductive band, almost any conductive material, or a shapeable conductive material which serves as an outer electrode terminal. By way of the now attached electrode terminal, the first tabs of layers of each G master electrode are conductively connected to a conductive element of the mounting structure (of a PC board, first level interconnect, or semiconductor chip) or equivalent structure inside a first level interconnect or semiconductor chip, such as conductively filled vias, conductive pads, conductive lines, or the like. Conductive material for example, such as but not limited to solder, solder paste, shapeable conductive material, reflow solder compounds, conductive adhesives may also electrical connect the electrode terminal that connects the first tabs of the G master electrode to a conductive mounting structure or conductive mounting surface. The second tabs of each G master electrode are similarly conductively connected to one another and to a mounting surface or the equivalent as the first tabs of each G master electrode were just described.

In any specific embodiment in which there exist more than one A layer and more than one B layer, preferably the first tabs of the A layers are aligned in the direction perpendicular to the plane defined by any of the major surfaces. Preferably, the second tabs of A layers are similarly aligned (although the first set of tabs of the A layers are off-set in alignment to the second set of tabs of the A layers). The first tabs of the B layers are similarly aligned, and the second tabs of the B layers are similarly aligned with the first set of tabs of the B layers are off-set in alignment to the second set of tabs of the B layers). This arrangement also allows first tabs of both A & B layer(s) to be adjacent to one another yet separated by a gap before the application of an outer electrode terminal completes tying of the adjacent A and B tabs to one another.

The layers of the A, B, and G master electrodes are separated from one another by one or more conductively insulating materials, including for example, almost any type of dielectric material possible, such as but not limited to X5R, X7R, NPO, Metal-oxide Varistor material, air, ferrite, undoped semiconductor, etc.

One significant aspect of the novel energy conditioners is that they can be inserted into a single path in a circuit, such as a line from a source of power to active circuitry wherein, inside the conditioner, the single pathway is split into at least two pathways (an A main body pathway and a B main body pathway) wherein the two internal pathways cross over one another. A second significant aspect of the novel energy conditioners is the ability to allow for an internal cross over of energy utilizing the A and B main body pathways that will occur in a region in which the A main bodies are shielded by the G master electrode from the B main bodies when energized.

A third significant aspect of the novel energy conditioners is that the pathway through the A and B master electrodes from the first tabs to the second tabs is substantially perpendicular to the pathway between the first tabs to the second tabs of the G master electrode. One way to define this relationship is that a first line from the first A tab to said second B tab crosses a second line from the first G tab to the second G tab at a crossing angle of at least 45 degrees, or at least 70 degrees, or at least 80 degrees, and preferably about 90 degrees. In context, about 90 degrees represents the fact that directions of the first and second line segments in any embodiment depend upon the starting point along the width of the tab regions where those lines terminate.

Generic Structural Designs for Tying:

There are many generic alternative designs for tying, some of which are detailed, as follows.

In a first alternative design, the energy conditioner includes a first conductive band and a second conductive band. The first conductive band and the second conductive band do no physically contact one another, and they each have a surface forming part of the external surface of the energy conditioner. The first conductive band is conductively contacted to the first tab of the A layer and to the first tab of the B layer to tie the first tabs together and (2) the second conductive band is conductively contacted to a second tab of the A layer and to a second tab of the B layer to tie the second tabs together.

In a second alternative design, tabs are tied directly to a circuit connection with out the intermediate conductive terminals. For example, one such design has no first or second conductive band, per se. These structures are designed with tabs of the A layer and the B layer so that, when the energy conditioner is in place for mounting on a mounting structure or mounting surface of a structure, solder, conductive paste or other shapeable conductive material can be placed to conductively connect and tie the first tabs of the A and B layers to one another and also to the mounting structure or mounting surface of a structure. Similarly, for the second tabs of the A and B layers. Similarly, tab connections of the respective G tabs may be conductively connected to another conductive structure, a conductive structure not conductively connected to any of the A and B connections.

In a third alternative design, the A, B, and G layers are formed as an integral part of a semiconductor chip, such as in integrated circuit, or as an integral part of a first level interconnect, and conductively filled vias or the like replace the aforementioned conductive bands or terminals, but directly conductively coupled with solder, conductive paste, or other shapeable conductive material. In this alternative, the equivalent to the elements of the a mounting structure are conductive connections of tabs and/or internal via portions within a device to outer conductive pathways extending away in any direction from the integral energy conditioner structure. These conductive pathways may be deposited conductive material, or conductive semiconductor pathways, and may extend in any direction away from the energy conditioner structure.

Certain embodiments have more than three external conductive bands in which each band is not in physical contact with any other band. Preferred embodiments of these novel energy conditioners have the conductive bands configured such that all the conductive bands may be connected to three planar-shaped conductive areas forming part of the mounting structure. These planar conductive terminals may be conductive pads, vias, or pad and via-in-pad combinations. The mounting structure may be a surface of a first level interconnect, and the pads and vias of the mounting structure may be part of the surface of the first level interconnect. Alternatively, mounting structure may be a surface of a semiconductor chip, such as an integrated circuit, and the pads and vias may be part of the surface of the semiconductor chip. A surface can be at any angle, not just horizontal and parallel to the earth or horizon, rather it can be on any surface location operable for attachment.

The term "plate" herein generally is used to simplify explanation by defining a combination of a dielectric under layer with none, one, or more than one distinct conductive over layers. However, the relevant structure is the sequence of conductive layers separated by dielectric material. The hidden surface of the structures referred as plates in the following figures represents a dielectric surface; that is, dielectric material vertically separating the defined conductive layers from one another. In discrete energy conditioner component embodiments, the structure are often formed by layering dielectric precursor material (green material) with conductive layer precursor material (conductive paste or the like), firing that layered structure at temperatures sufficient to convert the dielectric precursor to a desired structurally rigid dielectric material and to convert the conductive precursor layer to a high relatively conductivity (low resistivity) conductive layer. However, embodiments formed in interconnects and semiconductor structures would use different techniques, including conventional lithographic techniques, to fabricate equivalent or corresponding structures to those shown in the figures. Importantly, the conductive bands and solder connections for stacked layers discussed herein below would in many cases be replaced by an array of conductively filled or lined vias selectively connecting conductive layers of the same master electrode to one another. Preferably, those vias would be spaced to selectively contact the tab regions of the A, B, and G layers discussed herein.

BRIEF DESCRIPTION OF THE DRAWINGS

FIG. 6 is a plan view of certain conductive elements and a bottom dielectric layer of an embodiment of a novel energy conditioner 600;

FIG. 7. is a plan view of certain conductive elements and a bottom dielectric layer of an embodiment of a novel energy conditioner 700 that has a reverse aspect compared to the FIG. 6 embodiments;

FIG. 8A-L are plan views each showing arrangements of conductive elements of a mounting structure, including conductive pad and/or via structure to which novel discrete component energy conditioners disclosed herein may be mounted;

DETAILED DESCRIPTION

Figure 1A:
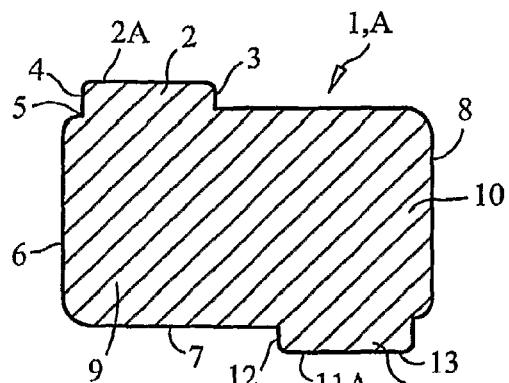
FIG. 1A is a plan view of a novel layer of an A master electrode of a novel energy conditioner.

The same reference numerals are used to refer to identical or similar elements throughout the drawings.

Figure 1B:
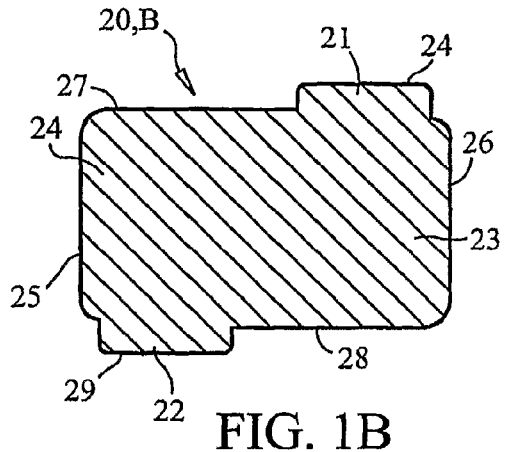
FIG. 1B is a plan view of a novel layer of a B master electrode of a novel energy conditioner.
Figure 1C:
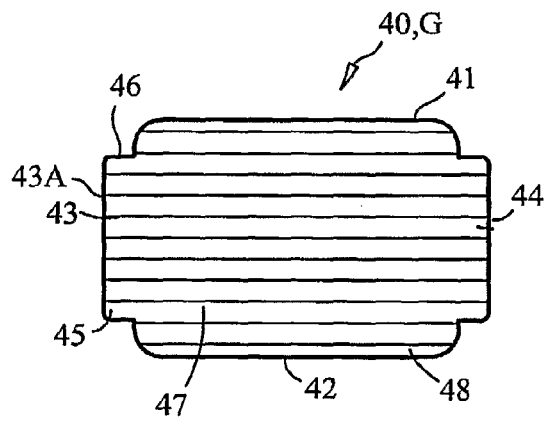
FIG. 1C is a plan view of a novel layer of a G master electrode of a novel energy conditioner.

FIGS. 1A to 1C show conductive layers or main body electrodes 1, 20, 40 that are stacked above one another in the sequence 1, 40, 20 in novel energy conditioner devices disclosed herein. Additional conductive main body electrodes may be present in the stack. In some cases, alternate configurations of stacked electrodes may comprise patterns of A and/or B layers following stacking sequences where multiple A and B layers can be stacked above or below one another in a random or patterned sequence to one another with or without an interposing shielding layer placed in-between an A layer and A layer, or an A layer and a B layer, or a B layer and a B layer. Any dielectric material may be used, such as formed into a dielectric layer 60 of FIG. 1D, to separate the main bodies of the main body electrodes from one another.

FIG. 1A shows a novel layer 1 of master electrode A of a novel energy conditioner.

Layer 1 includes first tab 2 protruding up from left hand side body portion 9 and delimited by first tab side surfaces 3, 4, and first tab outer surface 2a. First tab 2's side surface 4 and layer 1's side surface 6 optionally define surface region 5 interfacing between tab elements 4 and 6. Optionally, and as shown, surface region 5 is concave. Surface regions also together, define a perimeter of an electrode layer.

Layer 1 also includes second tab 11 protruding from right hand side body portion 10 and delimited by second tab side surfaces 12, 13, and second tab outer surface 11a. Second tab 11's side surface (unnumbered) and layer 1 side surface 8 may define an intervening surface region, which may be concave.

Tabs 2, 11 are preferably the same size and shape. However, tab 2 may be longer, such as twice as long as tab 11. Preferably, tabs 2 and 11 each extend less than one half the length (in the direction parallel to side surface 7) of layer 1. In a left to right or right to left view, the width of tabs 2 and 11 may extend less than one third, less than one fourth, or less than one tenth the length (right to left or left to right) of layer 1.

Second tab 11 projects out from layer 1 lower surface by a tab width equal to the extent of tab side surface 12. Preferably, tabs 2 and 11 have the same tab portion width in terms of projection beyond a main-body side surface or perimeter. However, either tab may be wider (right to left or left to right) than the other.

Tab inner side surfaces 3, 12 are preferably the same length (right to left or left to right). However, tab inner side surfaces 3, 12 may be different lengths and/or widths. Similarly, tab outer surfaces 2a, 11a may be of the same or different lengths, ranging from a fraction of the width of layer 1 (that is, the distance between side surfaces 6, 8) up to half the width of layer 1. The corners of layer 1 are shown to be rounded. However, they need not be rounded. Layer 1 side surfaces 8, 7, 6, 2A, 11A are shown as linear. However, they could be arced or have other minor variations from linear.

Layer 1 is, by definition, generally planar. However, a main body electrode is an alternative to layer 1. A main body electrode need not be planar. For example, a main body electrode could have contoured surfaces, such as arc, partial cylinders, or the like. In addition, a main body surface might have a thickness that varies from point to point along its major surface. Layer 1 comprises conductive material, preferably metal, such as copper, nickel, or other relatively low resistance metals. In other cases, material may be combined with conductive material to add resistance to the electrode.

FIG. 1B shows a novel layer 200f master electrode B of a novel energy conditioner.

Layer 20 is similar in shape to layer 1. In contrast to layer 1, layer 20 has first tab 21 above body portion 23, in other words, above the opposite side of the body of the layer as first tab portion 2 in layer 1. Similarly, layer 20 has second tab 22 below left side body portion 24, again, on the opposite side as the corresponding second tab 11 of layer 1.

First tab 21 is delimited by outer first tab surface 24, and second tab 22 is delimited by outer second tab surface 29. Layer 20 is delimited by layer 20 side surfaces 25, 26, upper side surface 27, lower side surface 28, as well as tab side surfaces 24, 29. Preferably, second tabs 22 and 11 have the same size and shape, and first tabs 2 and 21 have the same size and shape.

Preferably, layers 1 and 20 are mirror images of one another about a vertical axis running down the center of each layer.

In the preferred embodiments of energy conditioners contemplated herein, layers 1, 20 may range in thickness from a several tens of angstroms in certain integrated semiconductor embodiments to hundreds of microns in discrete device component embodiments. Electrode layers may be all of the same general thickness as manufacturing process allow, or the may be of a varying thickness, either pre-defined and in a positioned desired or randomly. Preferred embodiments have major surface areas of layers 1, 20 from a few microns to several square centimeters. It should be noted that various layering of electrodes may be enhanced by a process that allows for increased conductivity versus an similar layer of the same conductive material that did not receive a conductivity enhancement. FIG. 1C. shows novel conductive layer 40 of a G master electrode including a main body portion 47, left side tab 43, and right side tab 44. Left side tab 43 is delimited by side surfaces 45, 46, and end surface 43a. Preferably, right side tab 44 is sized and shaped similarly to left side tab 43. However, one of tab 43, 44 may longer and/or wider than the other tab. Tabs 43, 44 may be the same width as main body portion 47. Side surfaces 41, 42, 43A, 44A, 44B, 44C, (all 43Æs not shown), 45, 46 combine to form a perimeter of electrode or conductive layer 40. These similar side-surface elements of conductive layers 1 and 20 do so as well.

The main body of conductive layer 40 is partially delimited by top and bottom side surfaces 41, 42. Preferably, the distance between left side tab 43's upper and lower side surfaces 45, 46, is a substantial fraction of the distance between main body side top and bottom surfaces 41, 42, preferably at least fifty percent, more preferably at least 70 percent, most preferably about 100 percent. In some embodiments, the tabs of the G master electrode are wider than the main body, in which case the ratio of distance between left side tab 43's upper and lower side surfaces 45, 46 to the distance between main body side top and bottom surfaces 41, 42 is greater than one, such as between 1.1 and 1.5, and may exceed 5, referred to herein as flared tabs.

Preferably, conductive layer 40 preferably has a main-body portion that is larger than the main-body portions of layers 1 and 20 and thus extends beyond the main-body portions perimeters of layers 1 and 20 with the exceptions of the tabs of layers 1 and 20. Internal electrodes, main bodies, or layers, such as 1, 20, 40, may comprise any metal materials such as (but not limited to) nickel, nickel alloy, copper, or copper alloy, palladium alloys, or any other conductive material and/or combination of materials, semi-conductive materials, and combinations thereof.

Figure 1D:
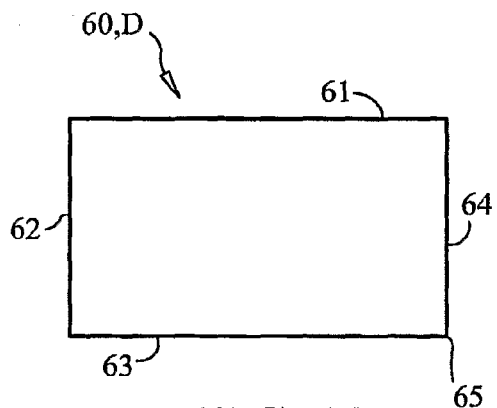
FIG. 1D is a plan view of a layer of dielectric material, D, often used in the novel energy conditioners disclosed herein.

FIG. 1D shows dielectric layer 60 having dielectric layer upper side surface 61, dielectric layer lower side surface 63, dielectric layer left side surface 62, and dielectric body right side surface 64. Corners, like corner 65, may be rounded. Preferably, dielectric layer 60 contains no apertures, forming a continuous sheet. However, alternate embodiments include apertures.

Dielectric layer 60 and all other dielectric layers in the contemplated embodiments of novel energy conditioners have thicknesses from a few angstroms to tens of microns, may comprise glass, ceramic, polycrystalline, amorphous, and crystalline forms of matter. Some useful commercial dielectrics are named to X7R, X5R, COG, NPO, MOV (metal oxide varistor). Capacitance between two conductive bodies increases as the inverse of their separation distance. Therefore, it is desirable to have relatively thin dielectric layers in structures designed to provide significant capacitance. As of 2003, mass production of 0402 sized 2.2 uF Multi-Layer Ceramic Capacitors (MLCC), as well as 0603 sized 10 uF components, both of which are the most widely used MLCC types in the industry. Higher values of capacitance in these and other standard EIA packages are expected.

In discrete component embodiments, conductive layers, like layers 1, 20, 40, are interleaved with dielectric material, like dielectric layer 60, forming a stack of layers. In these embodiments, preferably dielectric layer 60 and conductive layers 1, 20, 40, have dimensions such that each one of conductive layers 1, 20, 40, can be positioned above dielectric layer 60 such that the perimeter of the main bodies of the conductive layers reside within the perimeter of dielectric layer 60, and tab outer side surfaces of the conductive layers are aligned with the portions of the perimeter of dielectric layer 60. In addition, in these embodiments, the main body portions of the 1, 20 layers may be substantially of the same size and shape as one another. It fully contemplated that main-body portions of layer types, such as 1 and 20, may vary in a size and shape relationship to one another or groupings of such.

Figure 2:
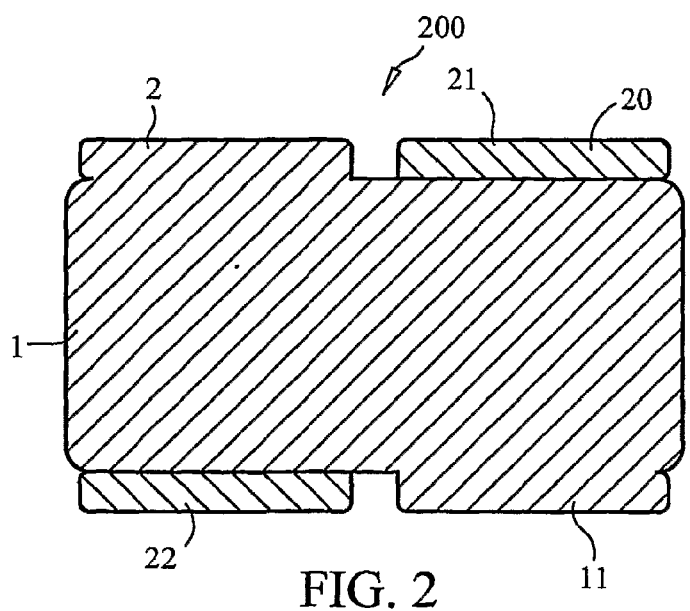
FIG. 2 is a plan view (plan view meaning a view of the plane defined by the major surfaces) showing layers 1 and 20 (layer 1 is at least a portion of A master electrode and layer 20 is at least a portion of B master electrode) in an overlapped relationship in which they typically exist in novel energy conditioners disclosed herein.

FIG. 2 shows in plan view a novel arrangement of layers 1 and 20. This arrangement is how layers 1 and 20 are arranged relative to one another in energy conditioner embodiments disclose herein. FIG. 2 shows body portions 9, 10 of layer 1 aligned with body portions 24, 26 of layer 20, and each one of tabs 2, 11, 21, 22 projecting away from the body portions, in plan view, at non-overlapped regions. FIG. 2 shows the outer side surfaces of tabs 2, 21 are aligned with one another, and the outer side surfaces of tabs 22, 11 are aligned with one another.

FIG. 2 also defines a gap of separation between adjacent tabs. A first gap 199A is created between tabs 2 and 21 by the stacking arrangement of layers 1 and 20, and a second gap 199B created between tabs 22 and 11 created by the stacking arrangement of layers 1 and 20. These gaps 199A and 199B clearly show that in order for adjacent tabs (2 and 21) and (22 and 11) to be conductively connected to one another, an additional conductive material portion such as a terminal electrode like a 302A and 302B of FIG. 3B will be needed to span the gaps to create a tying configuration. It should also be noted that when stacked with layers having main-body portions like layer 40, each main-body portion of layers 1 and 20 are found to be smaller than a main-body portion of layer 40 and will appear to be inset with the exception of each respective tabs of layers 1 and 20.

FIG. 2 illustrates the preferred arrangement of layers 1, 20, relative to one another, to illustrate that tabs 2, 21 can be easily conductively connected by additional structure extending there between, and that tabs 22, 11 similarly be connected. In the novel energy conditioner devices disclosed herein, a conductive layer 40 exists between layers 1, 20. As assembled or fabricated, preferably the top and bottom surfaces 41, 42, of the main body portion 47 of the master G electrode extend at least as far as the side surfaces of the main body portions of layers 1, 20. More preferably, in an assembly or fabrication, upper surface 40 extend further up than main body portions of layers 1, 20, and lower surface 42 extends further down than main body portions of layers 1, 20.

As described with respect to FIG. 5, the novel energy conditioners may have varying sequences of conductive layers including layers 1, 20, and 40. These varying sequence of layers are contemplated as internal structure for all structures shown in and discussed with respect to FIGS. 3-4 and 6-17. In addition, while it is preferred to have a layer 40 in-between a stacking of layer 1 and 20, alternative embodiments are fully contemplated such as were layers 1 and 20 do not have an interposed layer 40 between layer 1 and 20 somewhere in a stacking sequence. Arrangements of a layer 40 is inserted during a stacking sequence at a predetermined interval relative to the sequence of layers 1 and 20 is fully contemplated, as are stacking arrangements of a layer 40 is inserted during a stacking sequence at a random interval relative to the sequence of layers 1 and 20.

Moreover, the specific shapes of the conductive layers 1, 20, and 40 are exemplary, except for the existence of tabs generally overlapped as shown in FIG. 2. Thus, the layers shown in FIGS. 1A-1C may for example, include additional tabs concave side edged, convex side edges, major surfaces that are not flat, such as curved or wavy.

In addition, layers shown in FIGS. 1A-1B may be varied to include cavities or insets adjacent the inner sides edges of tabs, for example to further define a path of current flow within the corresponding main body portions. The cavities may be varying shapes, such as straight, arc, sinuous, or "L" shaped.

FIGS. 3A-3D show various arrangements of conductive materials and portions and conductive plates or layers to conductively directly connect all tabs of layers of the A, B and G master electrodes that are on the same side of the energy conditioner as one another, to each other, and to conductively connect each side of the of the energy conditioner to a mounting structure. FIGS. 3A-3D do not show the a mounting structure.

Figure 3A:
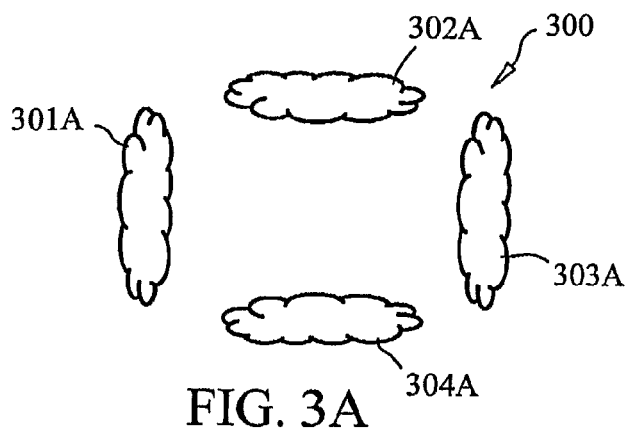
FIG. 3A is a plan view showing an arrangement 300 of shapeable conductive material for both tying together tabs of A and B master electrodes of the novel energy conditioners disclosed herein and conductively connecting A, B and G master electrodes to conductive elements of surface mounting structure by solder, conductive material, re-flow solder material, conductive adhesive.

FIG. 3A shows arrangement 300, which is a set of four conductive attachment material portions 301A, 302A, 303A, and 304A. This material may be a solder, a solder paste, or any conductive adhesive material, re-flow solder material or compounds that attach, for example. These conductive elements are usually variable in amount applied and may vary. These materials are usually applied during a mounting process, such as when a device is mounted to a conductive structure as part of a system such as a PCB board for example. The conductive attachment material portions are arranged so that: conductive material region 302A conductively contacts first tabs 2 and 21 to one another; conductive material region 304A conductively contacts second tabs 11 and 22 to one another; conductive material region 301A connects conductive tabs 43 (when the G master electrode includes more than one layer like layer 40) to one another; and conductive material region 303A connects conductive tabs 44 (when the G master electrode includes more than one layer like layer 40) to one another. In addition, conductive material regions 301A, 302A, 303A, 304A may contact to conductive elements of a mounting structure, such as the structures shown in FIG. 8A-8L.

Figure 3B:
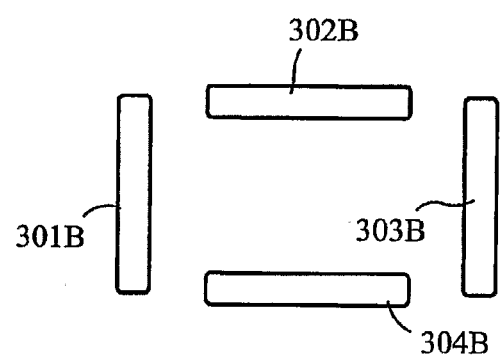
FIG. 3B is a plan view showing an arrangement of a set of conductive elements for tying together tabs of A and B master electrodes and conductively connecting to one another tabs of G master electrodes of the novel energy conditioners disclosed herein.

FIG. 3B shows a set of four applied conductive elements 301B, 302C, 303C, 304C, such as terminals or conductive electrode material that are applied to a body of the device before any final attachment of a device into a system. Conductive elements 301B, 302B, 303B, 304B, are arranged so that each one will face and contact to the outer side surfaces of the tabs of layers 1, 20, and 40. If elements 301B, 302B, 303B, 304B are electrode terminals made of conductive material, they may need to be conductively connected to outer side surfaces of the tabs of layers 1, 20, and 40 by intervening shapeable conductive material, such as solder.

Figure 3C:
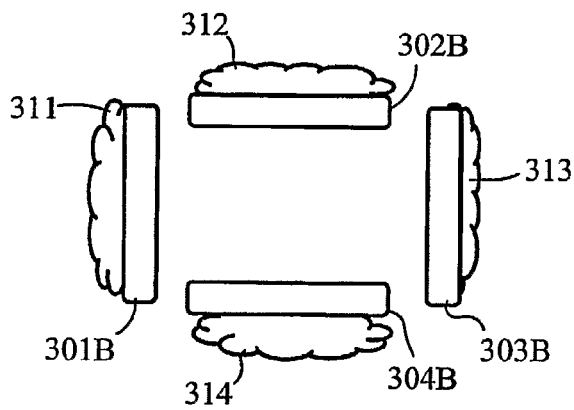
FIG. 3C is a plan view of the set of conductive elements of FIG. 3B and also shapeable conductive material for connecting the members of that set of conductive elements to conductive elements of the mounting structure.

FIG. 3C shows conductive elements 301B, 302B, 303B, 304B as in FIG. 3B, and also conductive attachment material portions 311, 312, 313, 314. Conductive attachment material portions may be used to conductively connect conductive elements 301B, 302B, 303B, 304B to elements of a mounting structure, such as the structures shown in FIG. 8A-8L.

Figure 3D:
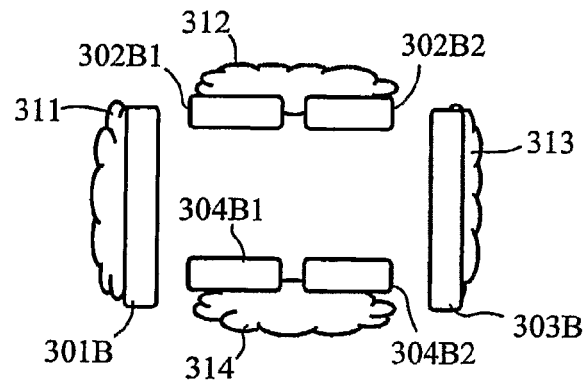
FIG. 3D is a plan view of an alternative set of conductive elements to the conductive elements shown in FIG. 3C and shapeable conductive material for connecting that alternative set of conductive elements to conductive elements of the a mounting structure.

FIG. 3D is similar to FIG. 3C, showing conductive attachment material portions 311, 312, 313, 314 and conductive elements 301B and 303B.

FIG. 3D is different from FIG. 3C in that it includes conductive elements 302B1 and 302B2 in place of 302B. Referring back to FIGS. 1A and 2, conductive element 302B13 is conductively connected to first tab 2 of layer 1. Conductive element 302B2 is conductively connected to first tab 21 of layer 20. In FIG. 3D, shapeable conductive material 312 serves the additional function of conductively connecting conductive elements 302B1 to 302B2, and likewise conductively connecting conductive elements 304B1 to 304B2.

Both the conductive attachment material portions and the conductive elements 302 may be formed from materials referred to as conductive paste, conductive glue, conductive solder material. These materials may comprise any metal material such as (but not limited to) nickel, nickel alloy, copper, or copper alloy, or any other conductive material that can facilitate electrical/conductive connection. The manufacturing processes for applying and connecting shapeable conductive material and/or conductive elements to tabs or other conductive elements can include applying them to surfaces, hardening them, or providing their desirable conductive properties by one or more of spraying, painting, soldering, such as reflux soldering, wave soldering, and high temperature firing. It should be noted that the conductive elements, such as 301B to 304B, may be formed from the same or similar material shapeable conductive materials, such as elements 301A to 304A, referred to in FIGS. 3A-3D. A difference being that material referred to as conductive attachment material portions have an additional function of conductively connecting to a conductive structure or conductive surface on which a novel energy conditioner resides.

FIGS. 4A-F and 4H-L show outer surfaces of novel energy conditioners having different configurations of external conductive bands or terminals. These outer conductive bands generally correspond in function to the elements 301B, 302B, 303B, and 304B of FIG. 3B or elements 301B, 302B1, 302B2, 303B, 304B1, and 304B2 in FIG. 3D. That is, the outer conductive bands are the elements that provide conductive connection of tabs on the same side as one another (FIG. 3B) or conductive connection at least of vertically aligned tabs (FIG. 3D).

Moreover, each one of the band structures shown in FIGS. 4A-F and 4H-L are compatible with and can connect to the various arrangements and combinations of elements of surface mounting structure shown in FIGS. 8A-8L, as described below.

Figure 4A:
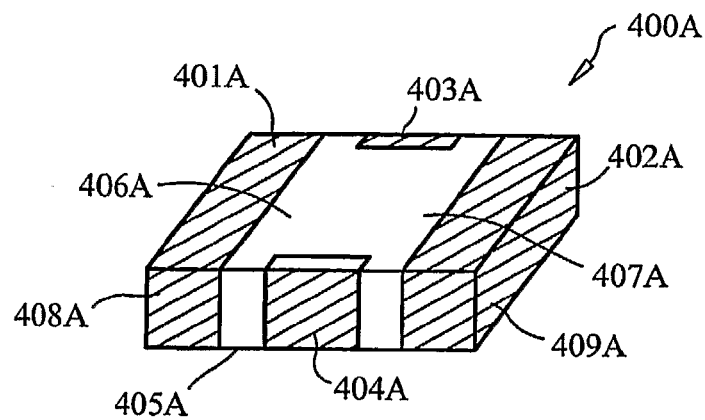
FIGS. 4A-F and 4H-L are each a perspective view showing outer surface of novel energy conditioners having different configurations of external conductive bands.

FIG. 4A shows energy conditioner 400 having external conductive bands 401A, 402A, 403A, 404A. Band 401 is shaped like a cap, extending on 5 adjacent sides (2 sides shown, 3 sides hidden); band 402 is shaped like a "U" extending along conditioner side surface 405A to conditioner top surface 406A and to conditioner bottom surface (hidden). Each band is physically separated from one another by dielectric 407A.

In one embodiment including the FIG. 4A bands, internal to conditioner 400, first tabs 2, 21 (of A and B master electrodes), may connect to band 401A, second tabs 22, 11 (of A and B master electrodes) may connect to band 402A, and tabs 43, 44 (of G master electrode) may connect respectively to bands 403A, 404A.

In a second embodiment including the FIG. 4A bands, internal to conditioner 400, first tabs 2, 21, (of A and B master electrodes), may connect to band 403A, second tabs 22, 11 (of A and B master electrodes) may connect to band 404A, and tabs 43, 44 (of G master electrode) may connect respectively to bands 401A, 402A, respectively. Note that, in this embodiment, tabs of the A and B master electrodes may be displaced slightly from the left and right hand sides by regions like region 5 in FIG. 1A, so that the A and B electrodes do not conductively contact the bands 401A, 402A. In addition, in this embodiment, the bands 403A, 404A, may be extend further than shown between side surfaces 408A, 409A so that they contact a large fraction of the length of outer or side surfaces of tabs of layers 1, 20, such as outer side surface 2a.

Figure 4B:
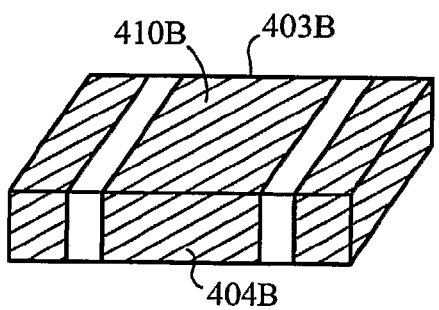
Figure 4C:
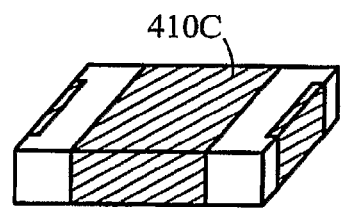
Figure 4D:
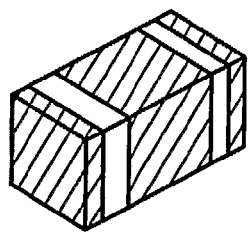

FIGS. 4B and 4C show conductive band arrangements similar to FIG. 4A in which similar internal connection of to tabs of the A, B, and G layers are made. FIGS. 4B and 4C have a central band 410B, 410C, extending on the top or on the top and bottom surfaces of the energy conditioner, conductively connecting bands 404B, and 404C to one another with one or two paths that are external to the G master electrode's structure.

In one alternative in which central band 410B conductively connects to the G master electrode, and central band 410B forms a ring around the energy conditioner, top and bottom layers, like layers 40, of the G master electrode are not included in the layered structure, since their function is provided by the top and bottom portions of the ring 410B.

In one alternative, A and B tabs connect to 410B. In this case, an enhancement of (lowering of) the impedance profile because of a larger conductive area will be observed.

Figure 4E:
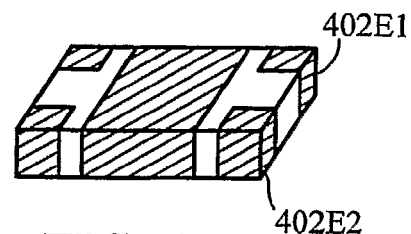
Figure 4F:
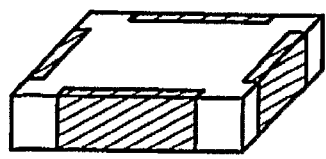

FIG. 4E shows band 402 split into bands 402E1 and 402E2, corresponding generally to the split conductive elements 302B1 and 302B2 of FIG. 3D. In one embodiment, bands 402E1, 402E2 internally conductively contact to first tabs 2, 21, respectively. In another embodiment, bands 402E1, 402E2 both internally conductively contact to different portions of tab 44 of the master G electrode of FIG. 1C.

Figure 4H:
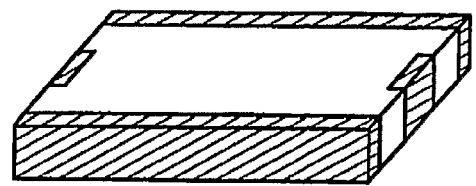
Figure 4I:
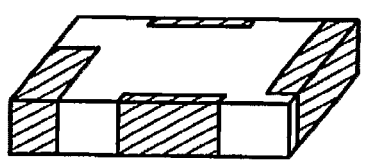

FIG. 4H shows a structure with a reverse aspect, in so far as the bands are concerned, compared to FIG. 4A. That is, the bands having the capped shape reside on the relatively longer sides in FIG. 4H and on the relatively shorter sides in FIG. 4A. These relatively wider capped shaped bands enable a relatively low ESR. Certain applications may require a specified ESR along certain lines. The FIGS. 4A and 4H reversed aspects and their different ESR values provide one design mechanism to control ESR to desired values. Lower ESR when combined with a mounting structure can produce an ultra-low ESL measurement for the combination of the inner electrodes with respective tabs, terminal electrodes, conductive attachment material, mounting structure and arranged vias as compared to other devices.

Figure 4J:
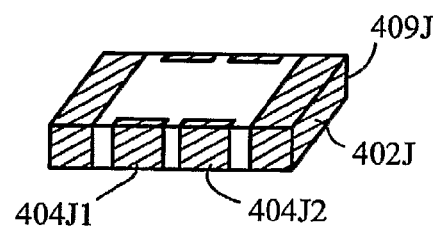
Figure 4K:
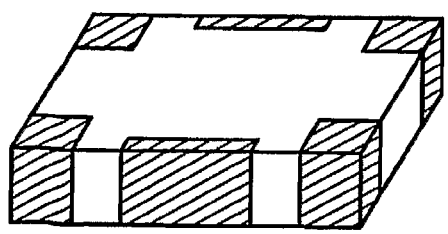

FIG. 4J corresponds closely to the contact arrangement shown in FIG. 3D wherein bands 404J1 and 404J2 correspond to conductive elements 304B1, 304B2. In one embodiment of FIG. 4J, first tabs 2, 21, each internally connect respectively to bands 404J1, 404J2. In another embodiment, first tabs 2, 21 both internally connect to along end 409J to band 402J.

Figure 4L:
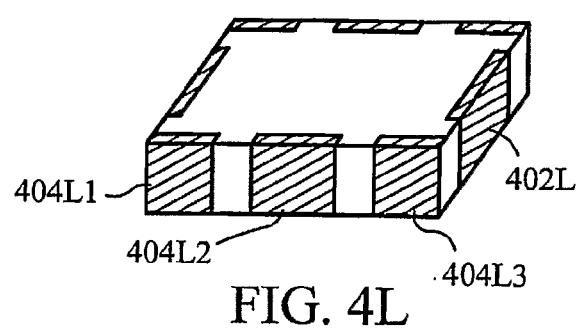

FIG. 4L show three side bands, bands 404L1, 404L2, and 404L3. It also shows side band 402L. Various embodiments having this band arrangement have: band 404L2 connected to tab 44 the G master electrode, band 404L3 and 404L2 connected to second tab 11 of the A master electrode, and band 404L2 and 404L1 connected to second tab 22 of the B master electrode. That is, tabs of A and B main body electrodes each connect to more than one tab and both connect to the central tab 404L2.

In one FIG. 4L alternative, second tab 11 may connect to two of the three bands 404L1, 404L2 and/or 404L3 and second tab 22 connect only to the remaining band. In embodiments in which one tab connects to more than one band, the outer side surface of the tab at locations where the tab does not oppose or connect to a band may be recessed from the side surface of the energy conditioner. The outer side surface of the tab in the recessed regions maybe be covered by dielectric material thereby preventing this region of the tab from being exposed on a side of the energy conditioner.

In another FIG. 4L alternative, second tabs 11, 22 may both only connect to the central band 404L2, and all other bands may connect only to the tabs of layers 40 of the G master electrode. In this embodiment, the tabs of the G master electrode are extended to extend from end portions of top and bottom surfaces 41, 42 of layer 40 so that the extended portions of the tabs may internally contact bands 404L1, 404L3. In this embodiment, layer 40's tabs also internally connect to the conductive band on end 402L.

The foregoing exemplary descriptions of embodiments for some of FIGS. 4A-4L shows that second tabs 11, 22, for example, can be adjacent any one of the four side surfaces of any one of the FIG. 4A-4L band structures, and all alternative connections of second tabs 11, 22 to bands along the adjacent side are contemplated. The size and shape of tabs may vary to provide a longer and more aligned interface between the outer side surface of the corresponding tab and the opposing inner side of the corresponding conductive band or bands.

Each of these outer band structures constitute part of at least one of the master electrodes. Each band may connect to one of the A, B, and G master electrode, or to both the A and B master electrodes.

Preferably, there is at least two bands for each pair of master electrodes, such as the A and B master electrode pair.

The energy conditioners shown in FIGS. 4A-4L may have the substantially the same length in two dimensions or three dimension, such that they have a length to width ratio of substantially 1 and a height to width ratio of substantially 1.

Preferably, preferably no more than two of the six surfaces of the energy conditioners shown in FIGS. 4A-4L have the same area. In some embodiments, however, 4 of the six surfaces do have the same area, such is FIG. 4D.

The bands forming a cap as shown by element 401A in FIG. 4A may be replaced by bands covering only 4,3, or two of the surfaces covered by band 401A. Similarly, bands shown covering only one surface may be extended around adjacent surfaces, partially as shown by band 404A in FIG. 4A, or completely as shown by band 410B in FIG. 4B. The straight edges of the bands may be replaced by curves, of various shapes, the corners and edges of the bands may be rounded, or flared, include cavities or protrusions. In addition, conductively floating bands, bands not connected to a master electrode, may be disposed on dielectric surfaces of the energy conditioners as additional shielding.

Figures 5A, 5B, 5C, 5D, 5E, 5F:
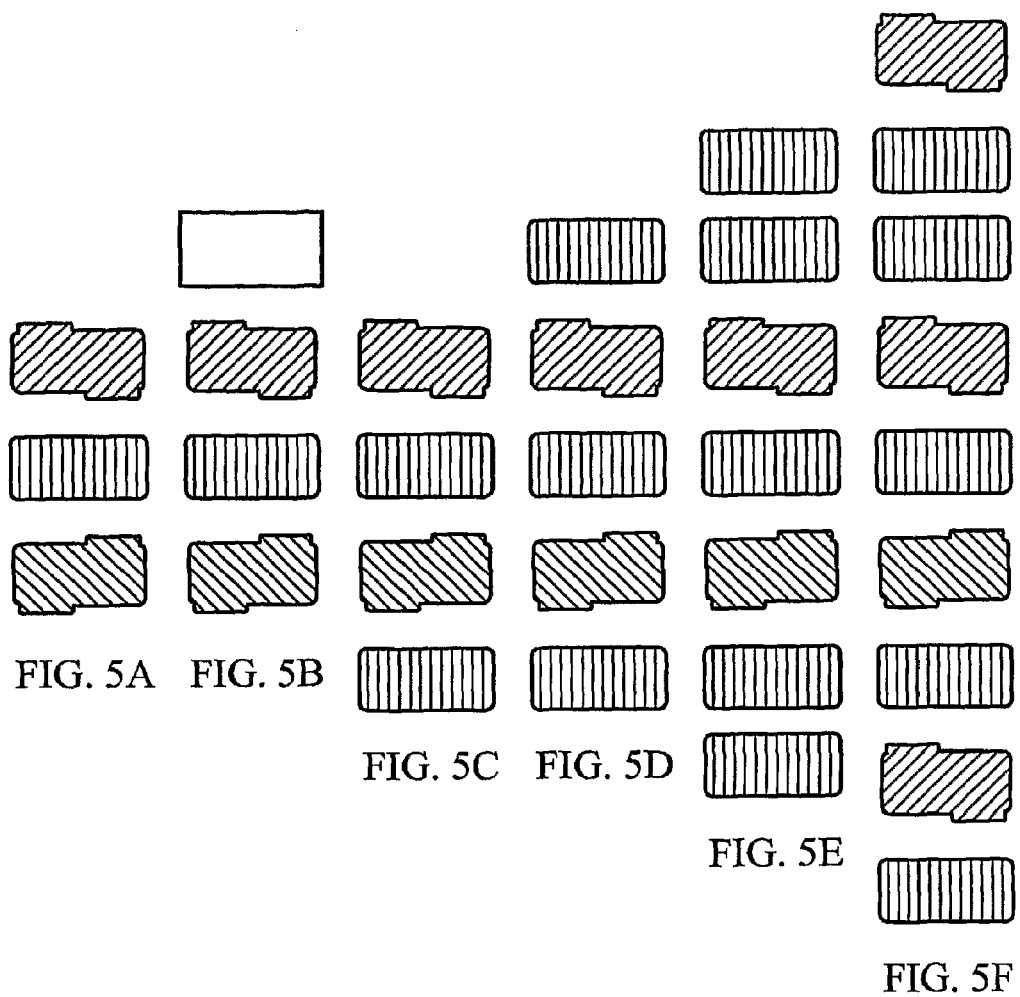
FIG. 5A is a schematic view of a sequence of stacked conductive layers of novel energy conditioners disclosed herein, in which the stack is exploded along a vertical axis and each layer is then rotated 90 degrees about its horizontal axis, in order to show the shape of the major surface of each layer and the stacking alignment of the layers.
FIG. 5B is the same type of schematic view as FIG. 5A, showing the same three conductive layers, and also shows an additional dielectric layer on the top of the stack.
FIG. 5C is the same type of schematic view as FIG. 5A, showing a set of four conductive layers of novel energy conditioners disclosed herein.
FIG. 5D is the same type of schematic view as FIG. 5A, showing a set of five conductive layers of novel energy conditioners disclosed herein.
FIG. 5E is the same type of schematic view as FIG. 5A, showing a set of seven conductive layers of novel energy conditioners disclosed herein.
FIG. 5F is the same type of schematic view as FIG. 5A, showing a set of nine conductive layers of novel energy conditioners disclosed herein.

FIGS. 5A-5F shows some of the contemplated conductive layer stacking sequences of the novel energy conditioners. Layers or main bodies of the A, B, and G master electrodes are referred to with respect to FIGS. 5A-5F below for convenience as merely A, B, or G respectively. FIG. 5A corresponds to the layers 1, 20, and 40 of the A, B, and G master electrodes shown in FIGS. 1A-1C in the sequence A, G, B.

FIG. 5B shows the sequence from top to bottom dielectric layer, A, G, B. FIG. 5B illustrates that the top (and bottom) conductive layers are preferably covered by dielectric.

FIG. 5C shows the sequence from top to bottom: A, G, B, G.

FIG. 5D shows the sequence from top to bottom: G, A, G, B, G.

FIG. 5E shows the sequence from top to bottom: G, G, A, G, B, G, G.

FIG. 5F shows the sequence from top to bottom: A, G, G, A, G, B, G, B, G.

All of the sequences of layers include a G layer, one A layer above the G layer, and one B layer below the G layer.

None of the sequences include an A, B with no intervening G there between. However as stated earlier there are situations where such a stacking is fully contemplated. For example, another stacking might have a sequence from top to bottom may have amongst its stacking: A, G, B, G, A, B, A, G, B, G, A, B and so on.

FIG. 6 shows novel energy conditioner 600 having sides 610, 620, 630, 640. FIG. 6 shows a sequence of stacked layers from top to bottom of 1, 40, 20, 60 (A, G, B, dielectric). Dielectric layers above dielectric layer 60 are not shown for convenience in order to show and describe relevant structural features of the conductive layers and elements.

FIG. 6 shows conductive elements 304B, 302B, tying the first tabs together, and tying the second tabs together. FIG. 6 show first tabs 2, 21 of the master A and B electrodes both contacting conductive element 304B, second tabs 11, 22, second tabs 11, 22 contacting conductive element 302B. FIG. 6 shows conductive elements 301B', 303B' contacting respectively to tabs 44, 43 of the G master electrode.

FIG. 6 shows generally annular region 48 of G master electrode's layer 40 extending on all sides beyond the edges of the main body portions of the layers 1, 20 of the A and B master electrodes. FIG. 6 shows annular region 48 of the G master electrode contained within the footprint of dielectric layer 60 such that the only regions of the G master electrode adjacent side surfaces of dielectric layers are the outer edge side surfaces of the G master electrode tabs 43, 44.

FIG. 6. also shows a gap 601A between the edges of tabs 11 and 22 and a corresponding gap 601B between edges of tabs 2, 21. The existence of gap 601A, 601B results in all paths in layer 1 between the tabs of layer 1 crossing all paths in layer 20 between the tabs of layer 20. Conductive element 301B includes side portion 602 on side 610, and conductive element 301B may include corresponding top and bottom portions (not shown) on top and bottom surfaces of energy conditioner 600. Side portion 602 of conductive element 301B does not extend along the side far enough to contact second tab 11. However, corresponding top and bottom portions of conductive element 301B' can extend further along the top and the bottom of energy conditioner 600, since no portion of conductive layers 1, 20 of the A or B master electrodes resides on the top and bottom of energy conditioner 600.

Energy conditioner 600 has side surfaces 610, 620, towards which tabs 2, 21, 11, 22 of the A and B master electrodes project, longer than side surfaces 630, 640 towards which tabs 43, 44 of the G master electrode project.

The ratio of a length of a side of an energy conditioner having tabs for the A and B master electrodes to a length of a side of energy conditioner 600 having tabs for the G master electrode is defined herein as an energy conditioner aspect ratio. The energy conditioner aspect ratio of energy conditioner 600 is greater than one.

In energy conditioner 600, sides 610, 620 to which tabs of the A and B master electrodes attach are longer than side 630, 640 to which tabs of the G master electrodes attach. In alternatives to the FIG. 6 embodiment, gaps 601A, 601B do not exist, such as when there is partial overlap of A, B electrodes. However, this type of configuration is believed to be less effective (but still effective) in conditioning energy than when there is no partial overlap. In alternatives to the FIG. 6 embodiment, gap 601A may exist, but gap 601B may not exist due to different sized and shaped tabs on opposite sides of the A and B master electrodes. This alternative also specifically applies to embodiments with more than A and B master electrodes, such as embodiment with more than 4 sides.

FIG. 7 shows energy conditioner 700, which has a reversed aspect ratio compared to the aspect ratio of energy conditioner 600. The aspect ratio of energy conditioner 700 is less than one. In FIG. 7, sides 630, 640 to which tabs of the A and B master electrodes attach are shorter than sides 610, 620 to which tabs of the G master electrode attach. Energy conditioner 700 defines gap 601A between the edges of tabs 11, 22, and gap 601B between the edges of tabs 21, 2.

Layer 40 extends beyond the perimeter of layers 1, 20 a distance 710. Tab 43 of layer 40 extends beyond the perimeter of layers 1, 20 a distance 720, which includes the distance 710 and the extension length of tab 43 toward side surface 620. Preferably, distance 710 is greater than zero, more preferably at least 1, 2, 5, 10, or 20 times the distance separating layer 40 from the closest main body or layer of the A or B master electrodes.

Conductive layers 1, 20 of FIG. 7 are shaped differently from conductive layers 1, 20 of FIG. 1 in that the tab portions reside on the shorter sides of these layers.

FIG. 8A-L each show one arrangement of conductive elements of mounting structure for mounting a single one of the novel discrete energy conditioners. These arrangements are also referred to as land patterns. The mounting structure may be a surface of a PC board, the surface of a first level interconnect, or the surface of a semiconductor chip, including for example an ASIC, FPGA, CPU, memory chip, transceiver chip, computer on a chip, or the like. The mounting structure comprises portions of the mounting surface to which a discrete component may be mechanically mounted and electrically connected. The mounting structure includes conductive pad and/or via structure. The via structure may be filled or lined with conductive material. The via structure may include a dielectric block preventing DC current transmission. Many of the mounting structures to which novel energy conditioners relate include vias extending perpendicular to layering, and conductive pathways defined in the plane of the layers. In PC board and some first level interconnects, the vias connect to conductive lines that extend to some other mounting structure on the boards or interconnects or to embedded passive circuitry such as embedded capacitors, inductors, resistors, and antennas. In semiconductor chips, the conductive lines in at least some instances extend to an active circuit component formed in the chip, such as a diode, transistor, memory cell, or the like.

FIG. 8A shows an arrangement 800A of mounting structure including a set of three generally rectangular shaped conductive pads 801, 802, 803. Conductive pads 801, 802, 803, have relatively long sides (unnumbered) and relatively short sides. The relatively short sides are labeled 801A, 802A, and 803A. Relatively short sides 801A, 802A, 803A are aligned with one another such that a straight line segment could contact substantially all of short sides 801A, 802A, and 803A. Conductive pad 801 contains vias 801V1, 801V2. Conductive pad 802 contains vias 802V1, 802V2. Conductive pad 803 contains vias 803V1, 803V2. Vias 801V1, 802V1, and 803V1 are aligned such that a single line segment could intersect them. Vias 801V2, 802V2, and 803V2 are aligned such that a single line segment could intersect them. It should be noted that, while many drawings shown such as FIGS. 9, 10, 11, 12, 13 depict placement of a device over a via or vias, the drawings are representative of the numbers of vias and pads with a device rather than true location of via(s) relative to a device structure.

Arrangements depicted disclose vias that tap various conductive layers located beyond the device attachment to a mounted conductive structure, such as power in (from an energy source) and/or power return (such as an energy return back to a source and/or a ground).

In an alternative to arrangement 800A, pads may have different sizes, lengths, or widths from one another. For example, pad 802 maybe shorter than pads 801, 803.

In another alternative to arrangement 800A, outer pads 801, 803 may have a different shape than central pad 802. For example, outer pads 801, 803 may include convex central regions and/or flared end regions. For example, outer pads 801, 803 maybe the same length as one another but shorter or longer than central pad 802.

In another alternative to arrangement 800A, certain vias may have a diameter larger than the width or length of the pad to which they are attached such that the via is not entirely contained within the footprint of a conductive pad. For example, a via diameter may be equal to a width of a conductive pad, 1.5, 2, or 3 times larger or smaller than a width of the conductive pad.

In another alternative to arrangement 800A, certain vias may have different cross-sectional diameters from one. For example, cross-section diameters of vias connecting to the central pad 802 may be 1/3, 2, 1, 1.5, 2, or 3 times larger or smaller than the cross-sectional diameter of vias connecting to outer pads 801, 803.

In another alternative to arrangement 800A, vias 802V1, 802V2 may be spaced from one another by more than or less than the spacing between vias 801V1, 801V2 and the spacing between 803V1, 803V2.

In another alternative to arrangement 800A, each conductive pad may contain one, two, three, or more vias. For example, each conductive pad 801, 802, 0803 may contain a single via. For example, pads 801 and 803 may contain 2 or 3 vias and pad 802 may contain one via. For example, pads 801 and 802 may contain 1 via and pad 802 may contain 2 or 3 vias.

In another alternative to arrangement 800A, the pads may not exist in which case just conductive vias exist in one of the foregoing arrangements. For example, two parallel rows of three vias.

In another alternative to arrangement 800A, some pads may have connected vias and some may not. For example, central pad 802 may contain 1, 2, 3, or more vias and outer pads 801, 803 may contain no vias. For example, central pad 802 may contain no vias and each outer pad 801, 803, may contain 1, 2, 3, or more vias.

In another alternative to arrangement 800A, the cross-sections of vias may not be circular, such as elliptical, elongated, or irregular.

FIGS. 8B-8L show various arrangements of the alternatives discussed above.

FIG. 8B shows arrangement 800B of mounting structure having vias of pad 802 more widely spaces than vias of pads 801, 803.

FIG. 8C shows arrangement 800C of mounting structure having vias having elongated cross-sections.

FIG. 8D shows arrangement 800D of mounting structure having a single via in each one of pads 801, 802, 803.

FIG. 8E shows arrangement 800E of mounting structure having pad 802 having one centrally located via.

FIG. 8F shows arrangement 800F of mounting structure having pads 801, 802, 803 having no vias.

FIG. 8G shows arrangement 800G of mounting structure having pads 801, 802, 803 each having three vias, each via in each pad aligned with one via in each one of the other two pads. FIG. 8H shows arrangement 800H of mounting structure having single via pads in which the central pad 802 is short than the outer pads 801, 803.

FIG. 8I shows arrangement 800I of mounting structure having outer pads 801, 803 longer than central pad 802, the outer pads each having two vias and central pad 802 having one via. FIG. 8J shows arrangement 800J of mounting structure having three pairs of vias, and no pads.

FIG. 8K shows arrangement 800K of mounting structure having outer pads 801, 803 having two vias and central pad 802 having three vias.

FIG. 8L shows arrangement 800L of mounting structure having central pad 802 having one via and outer pads 801, 803 having no vias.

Preferably, vias in each pad are spaced symmetrically on either side of the center of the pad. Preferably, the arrangement of vias is symmetric about the center point of central pad 802. The only constraint on variations of pads and vias combinations, sizes, and shapes in that the resulting arrangement must be configured to provide electrical or conductive contact to the A, B, and G electrodes of a discrete component novel energy conditioner. Thus, all of the various features of the alternative arrangements described above are compatible with one another, and the inventors contemplate all possible mix and match combinations.

Preferably, the combination of novel energy conditioner and surface mounting structure provides (1) a first in electrical or conductive contact to at least one and more preferably all conductive bands connected to one side of the A and B master electrodes, (2) a second in electrical or conductive contact to at least one and preferably all conductive bands connected to the opposite side of the A and B master electrodes, and (3) a third element in electrical or conductive contact to at least one and preferably all bands connected to both of the opposite ends of the G master electrode. The foregoing reference to electrical contact includes situations where DC current is blocked, such as where a dielectric cap or layer exists somewhere along a via. FIGS. 9-13 each schematically show a combination of a novel energy conditioner in operable location on arrangement of conductive mounting structure elements.

Figure 9:
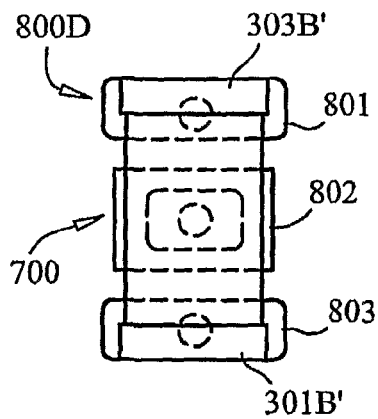
FIG. 9 is a schematic view showing a novel combination of a novel energy conditioner on an arrangement of mounting structure elements including conductive pads and vias, with one via per pad.

FIG. 9 shows a novel arrangement of an energy conditioner and mounting structure. FIG. 9 shows a novel energy conditioner 700', similar to energy conditioner 700 of FIG. 7, on mounting structure arrangement 800D. Energy conditioner 700' differs from energy conditioner 700 in that energy conditioner 700' lacks conductive elements 302B, 304B.

FIG. 9 shows conductive element 303B' (the conductive structure which ties together first tabs of the A and B master electrodes) above conductive pad 801, conductive element 301B' (the conductive structure which ties together second tabs of A and B master electrodes) above conductive pad 803. Conductive element 303B' can be conductively connected to pad 801, and conductive element 301B' can be conductively connected to pad 803, via use of shapeable conductive material, physical contact, or welding.

FIG. 9 also shows both conductive elements 302B, 304B (the conductive elements that connect to tabs of the G master electrode) above regions of conductive pad 802. In this spatial relationship, shapeable conductive material can be applied to connect to tabs 43, 44 of the G master electrode to conductive pad 802.

In FIG. 9, three conductive pads, pads 801, 802, 803, connect to all external electrode contacts, of energy conditioner 700'. Pad 802 connects to both tabs 43, 44, on opposite sides of the G master electrode.

FIG. 9 shows central conductive pad 802 wider and having larger surface area than either outer conductive pad 801, 803.

Figure 10:
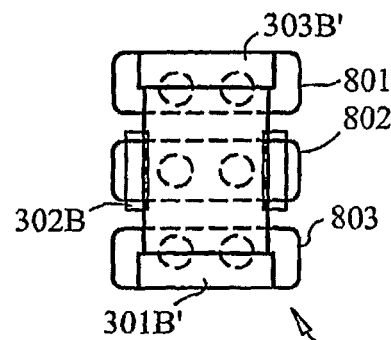
FIG. 10 is a schematic view showing a novel combination of a novel energy conditioner on an arrangement of mounting structure elements including conductive pads and vias, with two vias per pad.

FIG. 10 shows a novel energy conditioner, such as energy conditioner 700 of FIG. 7, above mounting structure arrangement 800A of FIG. 8A. Conductive elements or bands 303B', 301B' reside respectively above outer pads 801, 803. Conductive elements 302B, 304B (which connect respectively to tabs 43, 44, on opposite sides of the G master electrode) reside above inner pad 802. Conductive structure residing above each such pad can be conductively connected to that pad.

Figure 11:
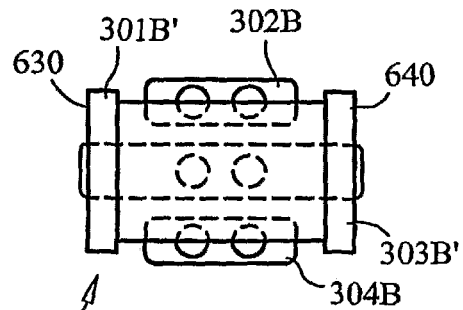
FIG. 11 is a schematic view showing a novel combination of a novel energy conditioner on an arrangement of mounting structure elements including conductive pads and vias, with two vias per pad and a central pad that extends further than the outer two pads such that the central pad can contact conductive terminals on left and right hand side of the energy conditioner.

FIG. 11 shows a novel energy conditioner, such as energy conditioner 600, arranged above mounting structure arrangement 800A'. Mounting structure arrangement 800A' is a modified version of arrangement 800A of FIG. 8A, in which central pad 802 is extended. However, mounting structure arrangement 800A' has central pad 802 extending horizontally beyond the horizontal extent of outer pads 801, 803, and extending horizontally far enough to underlay conductive elements 301B', 303B' at sides 630, 640. In addition, neither outer pad 801, 803 extends far underlay and contact conductive elements 301B', 303B' at sides 630, 640.

Figure 12:
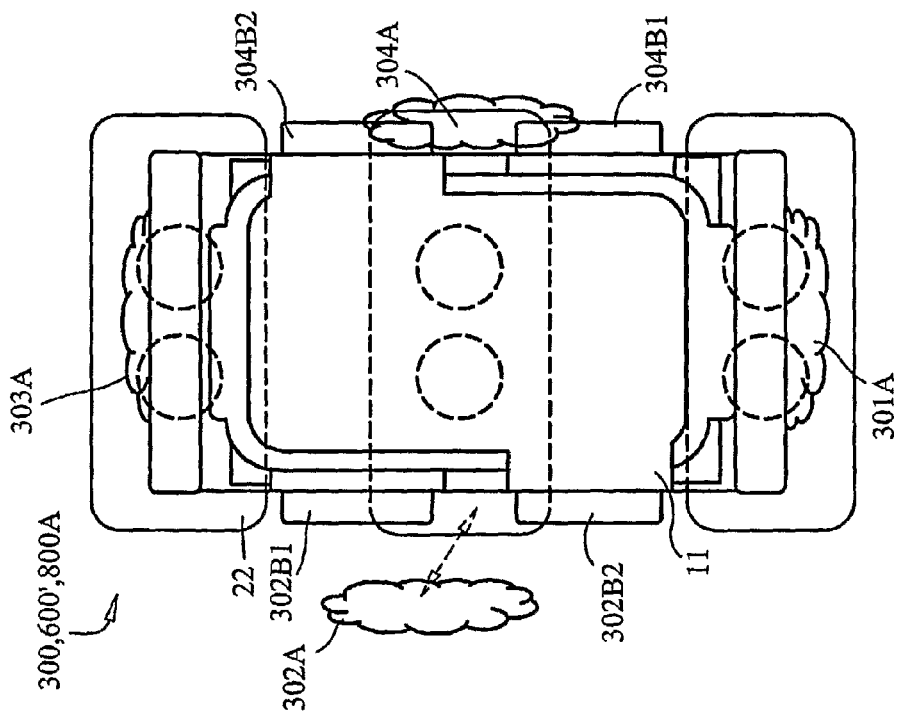
FIG. 12 is a schematic assembly view of a novel energy conditioner and an arrangement of mounting structure elements corresponding to FIG. 3A, illustrating use of shapeable conductive material, such as solder, to contact both (1) tabs and (2) mounting structure elements, such as pads and conductively filled or lined vias.

FIG. 12 is a schematic assembly of the arrangement of shapeable conductive material arrangement 300 of FIG. 3A, energy conditioner 600', and mounting structure arrangement 800A of FIG. 8A. Energy conditioner 600' is similar to energy conditioner 600 of FIG. 6. However, energy conditioner 600' does not have conductive elements 302B, 304B tying tabs together. Instead, energy conditioner 600' has split conductive elements 302B1 and 302B2, each of which connects to one set of stacked tabs of the A or B master electrode.

FIG. 12 schematically shows shapeable conductive material 302A tying tabs contacting split conductive elements 302B1 and 302B2 together, and also conductively contacting pad 302. FIG. 12 also shows shapeable conductive material 304A tying tabs contacting split conductive elements 304B1 and 304B2 together, and also conductively contacting pad 302.

Figure 13:
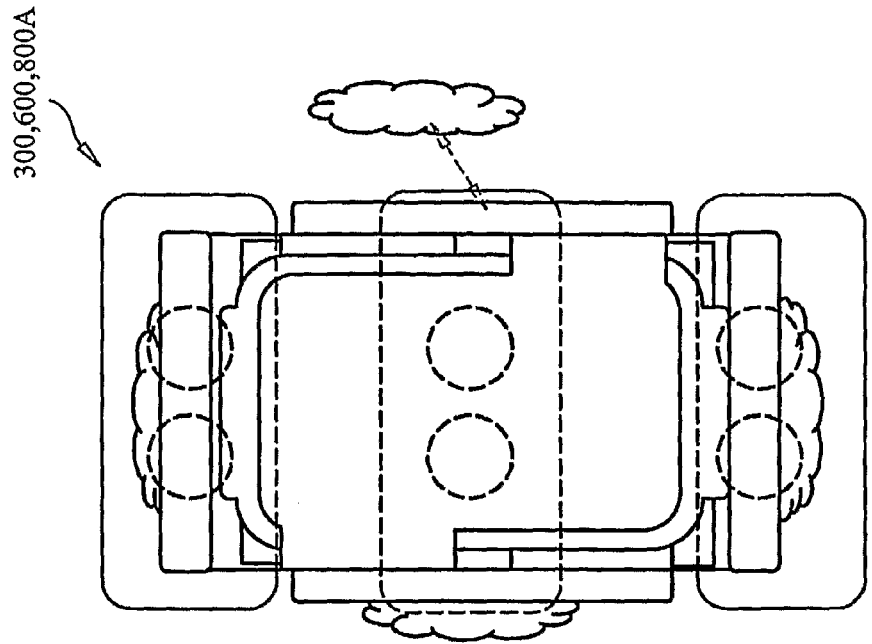
FIG. 13 is a schematic assembly view of a novel energy conditioner and an arrangement of mounting structure elements corresponding to FIGS. 3B and 3C, illustrating use of shapeable conductive material, such as solder, to conductively connect (1) the conductive elements for tying together tabs of A and B master electrodes and conductively connecting tabs of G master electrodes to one another to (2) the conductive elements of a mounting structure, such as pads and conductively filled or lined vias.

FIG. 13 is a schematic assembly of the arrangement of shapeable conductive material arrangement 300 of FIG. 3A, energy conditioner 600 of FIG. 6, and mounting structure arrangement 800A of FIG. 8A. In FIG. 13, shapeable conductive does not tie any electrode tabs. Instead, shapeable conductive material only conductively connects conductive elements, such as bands, to conductive pads 301, 302, 303.

Figure 14:
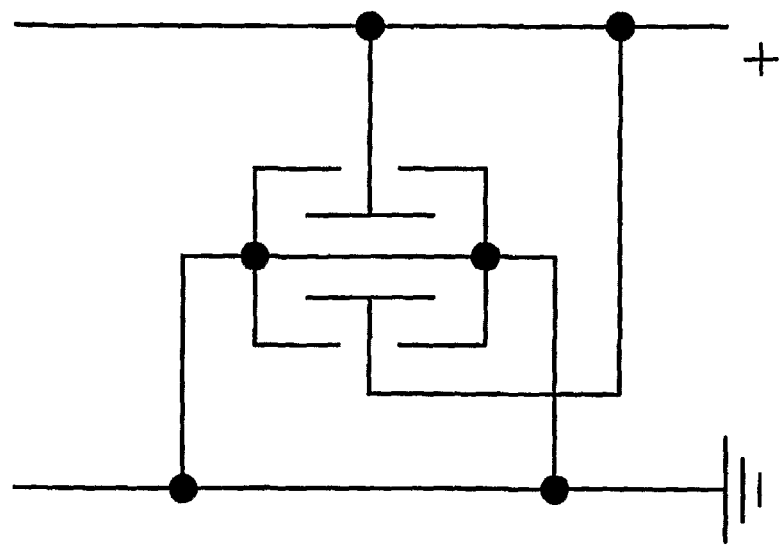
FIG. 14 shows one circuit diagram schematically illustrating electrical connection of energy conditioner 600 or 700. 304 and 302B may connect in parallel with a line running from a source of power to a load, and 301B' and 303B' may connect in parallel with a line connecting to a circuit or system ground.

FIG. 14 shows one circuit diagram schematically illustrating electrical connection of energy conditioner 600 or 700. 304 and 302B may connect in parallel with a line running from a source of power to a load, and 301B' and 303B' may connect in parallel with a line connecting to a circuit or system ground.

FIGS. 27, 28, 31, and 32 are views of energy conditioners including conductive layers on three planes and various external structures.

Figures 27, 28:
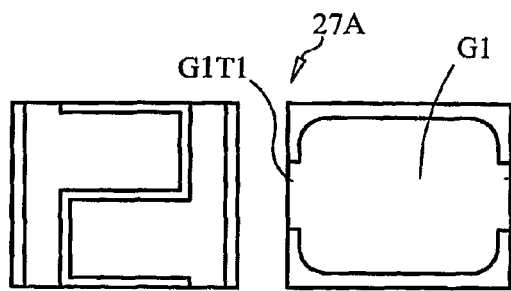
FIG. 27 is an exploded view of a set of two plates of a novel energy conditioner in which the plates have been displaced vertically in the page.
FIG. 28 is a perspective view of an exterior surface of a novel energy conditioner including the stack of two plates shown in FIG. 27.

FIG. 27 shows stack 27A including plates 2500A and 2700B. Plate 2700B differs from plate 2500B in that the tabs G1T1 and G1T2 of layer G1 are in the LS and RS as opposed to the US and LLS.

FIG. 28 schematically shows an energy conditioner defined by one arrangement of (1) stack 27A and (2) external structure 3A of FIG. 3A. Tabs A1T1 and B1T1 contact the internal surface of conductive band C3, tabs A1T2 and B1T2 contact the internal surface of conductive band C1, tab G1T1 contacts the internal surface of conductive band C2, and tab G1T2 contacts the internal surface of conductive band C4. In this energy conditioner, the A and B master electrodes are conductively tied together at the edges of the tabs by conductive bands C1, C3.

Figures 31, 32:
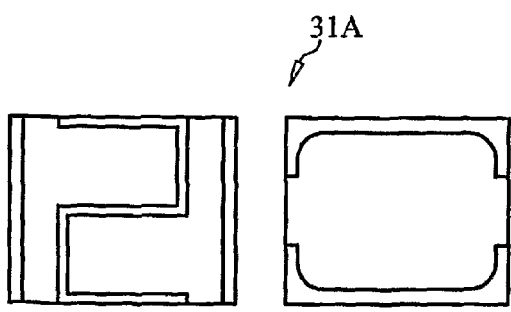
FIG. 31 is an exploded view of a set of two plates of a novel energy conditioner in which the plates have been displaced vertically in the page.
FIG. 32 is a perspective view of an exterior surface of a novel energy conditioner including the stack of two plates shown in FIG. 31.

FIG. 31 shows stack 31A including plates 2500A and 2500B. Stack 31A also includes a second plate 2500C having the same layered pattern as plate 2500A and on an opposite side of plate 2500A relative to plate 2500B. Plate 2500C has conductive layers A2 and B2 having tabs aligned with corresponding tabs of plate 2500A, including tab A2T1, A2T2, B2T1, and B2T2.

FIG. 32 schematically shows an energy conditioner defined by one arrangement of (1) stack 31A and (2) external structure 3A of FIG. 3A. In this structure, tabs for conductive layers of the same master electrode are aligned in the stack and contact conductive band structure. For example, tabs A1T1 and A2T1 are aligned and contact the internal surface of conductive band C1.

Alternatively, for FIG. 31, plate 2500C may be replaced by a plate having a conductive pattern that is a mirror image of the conductive pattern on plate 2500A, the mirror defined by a vertical line passing through the center of conductive plate 2500A. In this alternative, conductive tabs A1T1 and B2T2, for example, are vertically aligned and conductively connected by contacts to the inner surface of conductive band C1.

Figure 33:
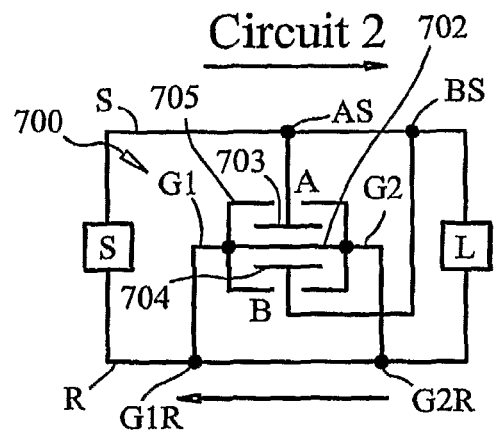
FIG. 33 is a partial schematic of circuit two for use with an energy conditioner having A, B, and G master electrodes.
Figure 34:
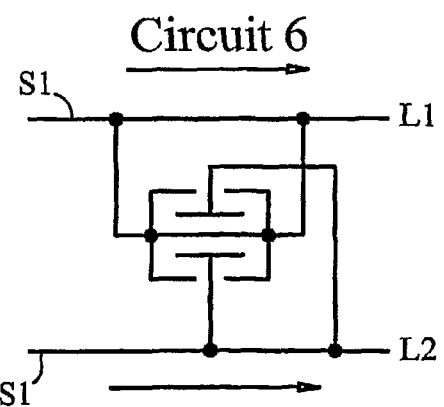
FIG. 34 is a partial schematic of a circuit six for use with an energy conditioner having A, B, and G master electrodes.

FIGS. 33 and 34 show circuits including an energy conditioner having A, B, and G master electrodes, which relate to the special properties of such conditioners. The inventors have determined that connection of the G master electrode at least two points, preferably at two points on opposite sides from one another, provides significant advantages. This is in spite of the fact that the G master electrode is a single conductive structure wherein location of connection would not be relevant in a lumped circuit representation. Circuit diagrams rely upon a lumped circuit model for accuracy of representation. In order to represent this geometric requirement relating to distributed circuit design in lumped circuit figures, the inventors schematically represent the energy conditioners as devices having at least 3 terminal device, with A, B, G terminals. More terminals may exist for each master electrode, and additional master electrodes may be integrated into the same component. The inventors have also determined that relative locations of A, B, and G electrode terminals relative to the A, B, and G master electrode structures, may affect performance of the energy conditioners. FIG. 33-34 therefore show circuits peculiar to this type of energy conditioner.

In FIGS. 33-34, external terminal A conductively connects to the A master electrode, external terminal B conductively connects to the B master electrode, external terminal G1 conductively connects to the G master electrode. More specifically as used in FIGS. 7-12, embodiments having at least 2 G external terminals, such as a G1 and G2, a first side of the G master electrode, and external terminal G2 conductively connects to a different side of the G master electrode.

FIGS. 33-34 each show conditioner 700, and external terminals A, B, G1, and G2. The G master electrodes is represented by portions 702, 705, and the A and B master electrodes are represented respective by flat plate elements 703, 703. Internal to conditioner 700, the G master electrode is spaced between or acts to shield the effects of charge buildup on the A master electrode from the B master electrode. This is schematically represented by the portion 702 of the G master electrode extending between the flat plate elements 703, 704 of the A and B master electrodes. G master electrode portion 705 schematically represents shielding by the G master electrode of the A and B master electrodes relative to space outside conditioner 700.

FIG. 33 shows a circuit 2 configuration for a conditioner 700 having A, B, and G master electrodes. External terminal A is tied to node AS on path S, external terminal B is tied to node BS also on path S, external terminal G1 is tied to node G1R on path R, and external terminal G2 is tied to node G2R also on path P. Arrows above and below conductive paths between SOURCE S of electrical power and LOAD L indicate that current flows in a loop.

FIG. 34 shows a circuit 6 configuration wherein external terminal A is tied to a node on path R, external terminal B is tied to a node on path R, and external terminals G1 and G2 are tied to nodes on path S.

The foregoing embodiments provide only exemplary descriptions of the novel energy conditioners and assemblies. Obvious modifications and alternatives are within the scope contemplated by the inventors. The following claims define the novel concepts discussed above.

The invention claimed is:

1. An energy conditioner comprising:
   a G master electrode, wherein said G master electrode comprises a first G main body electrode, and said first G main body electrode includes a first G main body;
   an A master electrode comprising first A main body electrode, and said first A main body electrode includes a first A main body, a first A tab, and a second A tab;
   a B master electrode comprising a first B main body electrode, and said first B main body electrode includes a first B main body, a first B tab, and a second B tab;
   wherein said first G main body has a first G main body major surface having a first G main body left side, a first G main body right side, a first G main body top side, and a first G main body bottom side;
   wherein said first A main body has a first A main body major surface having a first A main body left side, a first A main body right side, a first A main body top side, and a first A main body bottom side, and said first A tab extends from said first A main body left side, said second A tab extends from said first A main body right side;
   wherein said first B main body has a first B main body major surface having a first B main body left side, a first B main body right side, a first B main body top side, and a first B main body bottom side, and said first B tab extends from said first B main body left side, and said second B tab extends from said first B main body right side;
   wherein said first A main body is above said first G main body;
   wherein said first B main body is below said first G main body; and
   wherein a conductive path in said conditioner from said first A tab to said second A tab crosses a conductive path in said conditioner from said first B tab to said second B tab.

2. The conditioner of claim 1 wherein all conductive paths in said conditioner from said first A tab to said second A tab cross all conductive paths in said conditioner from said first B tab to said second B tab.

3. The conditioner of claim 1 wherein said first G main body electrode includes a first G tab, and a second G tab, said first G tab extends from said first G main body top side, and said second G tab extends from said first G main body bottom side.

4. The conditioner of claim 1 having a setback ratio of at least 1.

5. The conditioner of claim 1 further comprising an upper G main body electrode above all other structure of said A master electrode and said B master electrode and a lower G main body electrode below all structure of said A master electrode and said B master electrode.

6. The structure of claim 1 wherein said first A tab, said second A tab, said first B tab, said second B tab all have the same width.

7. The structure of claim 1 wherein said first A tab and said second A tab are less than one half a width of said A main body.

8. The structure of claim 1 further comprising at least one more of each of an A main body electrode, a B main body electrode, and a G main body electrode.

9. The conditioner of claim 1, wherein conductive paths in said energy conditioner from the first A tab and the first B tabs to the second A tab and the second B tab are generally perpendicular to conductive paths in said energy conditioner from the first G tab to the second G tab.

10. The conditioner of claim 1, wherein a first line from the first A tab to said second B tab crosses a second line from the first G tab to the second G tab at a crossing angle of at least 45 degrees.

11. The conditioner of claim 1, wherein a first line from the first A tab to said second B tab crosses a second line from the first G tab to the second G tab at a crossing angle of at least 70 degrees.

12. The conditioner of claim 1 having an energy conditioner aspect ratio of energy conditioner 600 is greater than one.

13. The conditioner of claim 1 wherein a majority of an area of said G main body electrode shields a majority of an area of the A main body electrode's conductive path from a majority of the area of the B main body electrode's conductive path.

14. The conditioner of claim 1 wherein the tab portions of the A layers do not overlap the tab portions of the B layers in the dimensions in which the first G main body major surface extends.

15. The conditioner of claim 1 further comprising:
   first structure conductively tying said first A tab and said first B tab together; and
   second structure conductively tying said second A tab and said second B tab together.

16. The conditioner of claim 15 wherein said first structure comprises a conductive band formed on said conditioner.

17. The conditioner of claim 15 wherein said first structure comprises solder.

18. The conditioner of claim 1 wherein said first G main body has a first G main body perimeter, said first A main body has as first A main body perimeter, said perimeter of said first G main body is greater than said perimeter of said first A main body.

19. The conditioner of claim 18 wherein said first A main body perimeter does not extend beyond said first G main body perimeter.

20. The conditioner of claim 18 wherein said first A main body perimeter is inset within said first G main body perimeter.

21. An assembly including the energy conditioner of claim 1 on a surface mounting structure, said surface mounting structure including a first conductive region, a second conductive region, and a third conductive region, and wherein said energy conditioner is positioned to conductively connect said first A tab and said first B tab to said first conductive region and said second A tab and said second B tab to said second conductive region.

22. The assembly of claim 21 wherein solder connects said first A tab and said first B tab to said first conductive region.

23. The assembly of claim 21 wherein said energy conditioner further comprises a first conductive band physically contacting to said first A tab and a second conductive band physically contacting to said first B tab, said first conductive band physically contacts said first conductive region, and said second conductive band physically contacts said first conductive region.

24. A method of making and energy conditioner comprising:
  providing a G master electrode, wherein said G master electrode comprises a first G main body electrode, and said first G main body electrode includes a first G main body;
  providing an A master electrode comprising first A main body electrode, and said first A main body electrode includes a first A main body, a first A tab, and a second A tab;
  providing a B master electrode comprising a first B main body electrode, and said first B main body electrode includes a first B main body, a first B tab, and a second B tab;
  wherein said first G main body has a first G main body major surface having a first G main body left side, a first G main body right side, a first G main body top side, and a first G main body bottom side;
  wherein said first A main body has a first A main body major surface having a first A main body left side, a first A main body right side, a first A main body top side, and a first A main body bottom side, and said first A tab extends from said first A main body left side, said second A tab extends from said first A main body right side;
  wherein said first B main body has a first B main body major surface having a first B main body left side, a first B main body right side, a first B main body top side, and a first B main body bottom side, and said first B tab extends from said first B main body left side, and said second B tab extends from said first B main body right side;
  wherein said first A main body is above said first G main body;
  wherein said first B main body is below said first G main body; and
  wherein a conductive path in said conditioner from said first A tab to said second A tab crosses a conductive path in said conditioner from said first B tab to said second B tab.

25. A method of using energy conditioner, said energy conditioner comprising:
  a G master electrode, wherein said G master electrode comprises a first G main body electrode, and said first G main body electrode includes a first G main body;
  an A master electrode comprising first A main body electrode, and said first A main body electrode includes a first A main body, a first A tab, and a second A tab;
  a B master electrode comprising a first B main body electrode, and said first B main body electrode includes a first B main body, a first B tab, and a second B tab;
  wherein said first G main body has a first G main body major surface having a first G main body left side, a first G main body right side, a first G main body top side, and a first G main body bottom side;
  wherein said first A main body has a first A main body major surface having a first A main body left side, a first A main body right side, a first A main body top side, and a first A main body bottom side, and said first A tab extends from said first A main body left side, said second A tab extends from said first A main body right side;
  wherein said first B main body has a first B main body major surface having a first B main body left side, a first B main body right side, a first B main body top side, and a first B main body bottom side, and said first B tab extends from said first B main body left side, and said second B tab extends from said first B main body right side;
  wherein said first A main body is above said first G main body;
  wherein said first B main body is below said first G main body; and
  wherein a conductive path in said conditioner from said first A tab to said second A tab crosses a conductive path in said conditioner from said first B tab to said second B tab;
  said method comprising conductively connecting said energy conditioner in a circuit.

26. An energy conditioner comprising:
  a stacked, plurality of dielectric sheets formed into a body;
  a plurality of electrodes including at least a first, a second, and a third electrode, each one of said plurality of electrodes arranged conductively isolated from all other ones of said plurality of electrodes, each one of said plurality of electrodes arranged on a dielectric sheet of said plurality of dielectric sheets, and each one of said plurality of electrodes disposed on a different one of said plurality of dielectric sheets than any other one of said plurality of electrodes;
  wherein said second electrode is larger than either said first electrode or said third electrode, and wherein said second electrode is sandwiched in-between said first electrode and said third electrode; and
  wherein all electrodes of said plurality of electrodes are feed-through electrodes.

27. The energy conditioner of claim 26, further comprising:
  a plurality of electrode extensions;
  wherein said first, said second, and said third electrode are each formed with at least two electrode extensions of said plurality of electrode extensions; and
  wherein each electrode extension of said at least two electrode extensions of any one said electrode extends outward to an opposite side of said body relative to the other.

28. The energy conditioner of claim 26, further comprising:
  a plurality of outer electrodes including at least a first, a second and a third outer electrode;
  wherein said first electrode is conductively coupled to said first and said third outer electrode;
  wherein said third electrode is conductively coupled to said third and said first outer electrode; and
  wherein said second electrode is conductively coupled to said second outer electrode.

29. The energy conditioner of claim 28, further comprising:
  a plurality of mounting pads including at least a first, a second and a third mounting pad;
  wherein said first outer electrode is conductively coupled to said first mounting pad;
  wherein said third outer electrode is conductively coupled to said third mounting pad; and
  wherein said second outer electrode is conductively coupled to said second mounting pad.

30. The energy conditioner of claim 28, wherein said second electrode is conductively coupled to a fourth outer electrode of said plurality of outer electrodes.

31. The energy conditioner of claim 30, further comprising:

a plurality of mounting pads including at least a first, a second and a third mounting pad;
wherein said first outer electrode is conductively coupled to said first mounting pad;
wherein said third outer electrode is conductively coupled to said third mounting pad; and
wherein said second and said fourth outer electrode are conductively coupled to said second mounting pad.

32. The energy conditioner of claim 26, further comprising;
a plurality of outer electrodes including at least a first, a second, a third, a fourth and a fifth outer electrode;
wherein said first electrode is conductively coupled to said first and said fourth outer electrode, and wherein said third electrode is conductively coupled to said second and said third outer electrode, and wherein said second electrode is conductively coupled to said fifth outer electrode;
a plurality of mounting pads including at least a first, a second and a third mounting pad;
wherein said first and said fourth outer electrode are conductively coupled together to one another and said first mounting pad by a conductive material;
wherein said second and said third outer electrode are conductively coupled together to one another and said third mounting pad by a conductive material, and wherein said fifth outer electrode is conductively coupled to said second mounting pad by a conductive material.

33. The energy conditioner of claim 27, further comprising;
a plurality of outer electrodes;
wherein a first electrode extension of said plurality of electrode extensions of said first electrode is conductively coupled to a first outer electrode of said plurality of outer electrodes;
wherein a second electrode extension of said plurality of electrode extensions of said first electrode is conductively coupled to a third outer electrode of said plurality of outer electrodes;
wherein a first electrode extension of said plurality of electrode extensions of said third electrode is conductively coupled to said third outer electrode of said plurality of outer electrodes;
wherein a second electrode extension of said plurality of electrode extensions of said third electrode is conductively coupled to said first outer electrode of said plurality of outer electrodes; and
wherein at least a first electrode extension of said plurality of electrode extensions of said second electrode is conductively coupled to at least a second outer electrode of said plurality of outer electrodes.

34. The energy conditioner of claim 29, wherein said second electrode is conductively coupled to at least a fourth outer electrode of said plurality of outer electrodes.

35. The energy conditioner of claim 33, wherein at least a second electrode extension of said plurality of electrode extensions of said second electrode is conductively coupled to at least a fourth outer electrode of said plurality of outer electrodes.

36. The energy conditioner of claim 27, further comprising:
a plurality of outer electrodes;
wherein a first electrode extension of said plurality of electrode extensions of said first electrode is conductively coupled to a first outer electrode of said plurality of outer electrodes;
wherein a second electrode extension of said plurality of electrode extensions of said first electrode is conductively coupled to a fourth outer electrode of said plurality of outer electrodes;
wherein a first electrode extension of said plurality of electrode extensions of said third electrode is conductively coupled to a second outer electrode of said plurality of outer electrodes;
wherein a second electrode extension of said plurality of electrode extensions of said third electrode is conductively coupled to a third outer electrode of said plurality of outer electrodes; and
wherein a first electrode extension and a second electrode extension of said plurality of electrode extensions of said second electrode is conductively coupled to at least a fifth outer electrode of said plurality of outer electrodes.

37. The energy conditioner of claim 36, wherein said second electrode is conductively coupled to at least a sixth outer electrode of said plurality of outer electrodes.

38. An energy conditioner comprising:
a dielectric material;
at least three feed-through electrodes, including a first, a second, and a third feed-through electrode that are arranged conductively isolated from one another within said energy conditioner by said dielectric material;
wherein said second feed-through electrode is larger than either said first feed-through electrode or said third feed-through electrode;
wherein said second feed-through electrode is stacked sandwiched and in-between said first feed-through electrode and said third feed-through electrode; and
wherein said first feed-through electrode and said third feed-through electrode are of the same shape and size.

39. The energy conditioner of claim 38, wherein said first feed-through electrode and said third feed-through electrode are arranged in complementary position to one another relative to a position of said second feed-through electrode.

40. An energy conditioner comprising;
a plurality of shielded electrodes including a first and a second shielded electrode;
a plurality of shielding electrodes including a first, a second and a third shielding electrode;
wherein any one shielding electrode of said plurality of shielding electrodes is larger than any one shielded electrode of said plurality of shielding electrodes;
wherein said plurality of shielding electrodes is conductively isolated from said plurality of shielded electrodes;
a plurality of outer electrodes;
wherein said first and said second shielded electrodes are conductively coupled to a first outer electrode of said plurality of outer electrodes;
wherein said first, said second, and said third shielding electrodes are conductively coupled to a second outer electrode of said plurality of outer electrodes; and
wherein said first, said second, and said third shielding electrodes are conductively coupled to a third outer electrode of said plurality of outer electrodes.

41. The energy conditioner of claim 30, wherein any one of said shielding electrodes of said plurality of shielding electrodes is arranged in aligned position of any one other of said shielding electrodes of said plurality of shielding electrodes.

42. The energy conditioner of claim 40, wherein said first and said second shielded electrodes are arranged in complementary position to one another relative to a position of any one said shielding electrode of said plurality of shielding electrodes.

43. An energy conditioner comprising;
a dielectric material;
at least a first electrode layer, a second electrode layer, and a third electrode layer, wherein said electrode layers are arranged conductively isolated from one another by said dielectric material;
wherein said second electrode layer is larger than either said first electrode layer or said third electrode layer, and wherein said first electrode layer is arranged below said second electrode layer;
wherein said third electrode layer is arranged stacked above said second electrode layer;
wherein said second electrode layer shields said first electrode layer from at least said third electrode layer; and
wherein all electrodes of said plurality of electrodes are feed-through electrodes.

44. The energy conditioner of claim 29, wherein said first mounting pad is conductively connected to a first circuit leg located between an energy source and a load;
wherein said third mounting pad is conductively connected to said first circuit leg located between an energy source and a load; and
wherein said second mounting pad is conductively connected to a second circuit leg located between said load and said energy source.

45. The energy conditioner of claim 44, wherein said load comprises a field programmable gate array (FPGA) chip.

46. The energy conditioner of claim 44, wherein said load comprises at least one silicon chip.

47. The energy conditioner of claim 44, wherein said load comprises at least one integrated circuit semiconductor chip and said energy conditioner is operable when energized as a decoupler for a portion of a power distribution network of said at least one integrated circuit semiconductor chip.

* * * * *

UNITED STATES PATENT AND TRADEMARK OFFICE
Certificate

Patent No. 7,817,397 B2                                                         Patented: October 19, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William M. Anthony, Erie, PA (US); and Anthony A. Anthony, Erie, PA (US).

Signed and Sealed this Tenth Day of July 2012.

JARED FUREMAN
*Supervisory Patent Examiner*
Art Unit 2836
Technology Center 2800